United States Patent
Liu et al.

(10) Patent No.: US 11,219,043 B2
(45) Date of Patent: Jan. 4, 2022

(54) METHOD FOR DETERMINING PRIORITIES OF SCHEDULING REQUESTS, TERMINAL DEVICE, AND BASE STATION

(71) Applicant: HUAWEI TECHNOLOGIES CO., LTD., Shenzhen (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/646,241

(22) PCT Filed: May 16, 2018

(86) PCT No.: PCT/CN2018/087184
§ 371 (c)(1),
(2) Date: Mar. 11, 2020

(87) PCT Pub. No.: WO2019/062150
PCT Pub. Date: Apr. 4, 2019

(65) Prior Publication Data
US 2020/0275462 A1 Aug. 27, 2020

(30) Foreign Application Priority Data
Sep. 29, 2017 (CN) .......................... 201710906149.X

(51) Int. Cl.
*H04W 4/00* (2018.01)
*H04W 72/12* (2009.01)
(52) U.S. Cl.
CPC ... *H04W 72/1242* (2013.01); *H04W 72/1284* (2013.01)

(58) Field of Classification Search
USPC ......................................... 370/330, 328, 329
See application file for complete search history.

(56) References Cited

U.S. PATENT DOCUMENTS

| 10,080,199 B2 * | 9/2018 | Chae .................. H04W 52/228 |
| 2015/0078231 A1 | 3/2015 | Bergström et al. |

(Continued)

FOREIGN PATENT DOCUMENTS

| CN | 101877911 A | 11/2010 |
| CN | 102804667 A | 11/2012 |

(Continued)

OTHER PUBLICATIONS

Nokia, "On collisions between sTTI and TTI transmissions in UL", R1-1712936, 3GPP TSG RAN WG1 Meeting #90, Prague, Czech Republic, Aug. 21-25, 2017, 8 pages.

(Continued)

*Primary Examiner* — David Q Nguyen
(74) *Attorney, Agent, or Firm* — Maier & Maier, PLLC

(57) ABSTRACT

A method for determining priorities of scheduling requests including: determining, by a terminal device, that a first time domain resource collides with a second time domain resource, where the first time domain resource is used to transmit a first scheduling request, and the second time domain resource is used to transmit a second scheduling request; determining, by the terminal device, a priority of the first scheduling request and a priority of the second scheduling request according to first priority information of the first scheduling request and first priority information of the second scheduling request; and if the priority of the first scheduling request is higher than the priority of the second scheduling request, sending, by the terminal device, the first scheduling request to a base station.

14 Claims, 9 Drawing Sheets

(56) References Cited

U.S. PATENT DOCUMENTS

| | | | |
|---|---|---|---|
| 2016/0100389 A1 | 4/2016 | Zhao et al. | |
| 2016/0128115 A1 | 5/2016 | Panteleev et al. | |
| 2017/0302419 A1* | 10/2017 | Liu | H04L 5/0082 |
| 2017/0367110 A1* | 12/2017 | Li | H04W 74/0816 |
| 2018/0206264 A1 | 7/2018 | Li et al. | |
| 2018/0270698 A1* | 9/2018 | Babaei | H04W 28/0278 |
| 2018/0324787 A1* | 11/2018 | Yin | H04L 1/1861 |
| 2018/0359711 A1* | 12/2018 | Akkarakaran | H04W 52/325 |
| 2019/0045546 A1* | 2/2019 | Li | H04W 74/0841 |
| 2019/0104565 A1* | 4/2019 | Park | H04L 5/001 |

FOREIGN PATENT DOCUMENTS

| | | |
|---|---|---|
| CN | 106797282 A | 5/2017 |
| CN | 107005828 A | 8/2017 |
| WO | 2017/045201 A1 | 3/2017 |

OTHER PUBLICATIONS

Huawei, Hisilicon, "Discussion on SR in shortened TTI scenario", R1-1712127, 3GPP TSG RAN WG1 Meeting #90, Prague, Czech Republic, Aug. 21-25, 2017, 6 pages.

QUALCOMM Incorporated, "Resource allocation and transmit diversity for PUCCH", R1-1716426, TSG-RAN WG1 Meeting #90, Prague, Czech Republic, Aug. 21-25, 2017, 14 pages.

Intel Corporation, "SR configuration and UL data scheduling", 3GPP TSG RAN WG1 Meeting #90, R1-1712591, Aug. 21-25, 2017, total 4 pages, Prague, P. R. Czechia.

\* cited by examiner

METHOD FOR DETERMINING PRIORITIES OF SCHEDULING REQUESTS, TERMINAL DEVICE, AND BASE STATION

CROSS-REFERENCE TO RELATED APPLICATIONS

This application is a national stage of International Application No. PCT/CN2018/087184, filed on May 16, 2018, which claims priority to Chinese Patent Application No. 201710906149.X, filed on Sep. 29, 2017. Both of the aforementioned applications are hereby incorporated by reference in their entireties.

TECHNICAL FIELD

The embodiments relate to the field of communications technologies, including a method for determining priorities of scheduling requests, a terminal device, and a base station.

BACKGROUND

When a terminal device has an uplink transmission requirement, the terminal device sends a scheduling request to a base station to obtain a time domain resource and a frequency domain resource allocated by the base station. After the base station receives the scheduling request sent by the terminal device, the base station sends downlink control signaling to the terminal device to send information about the allocated resources to the terminal device. The terminal device may communicate with the base station on the resources allocated by the base station.

A Long Term Evolution (LTE) system supports only one service type. The service type corresponds to only one scheduling request. Therefore, the terminal device requires only one scheduling request. In this case, no collision occurs with respect to the scheduling request sent by the terminal device. Different from the LTE system, fifth generation (5G) new radio (NR) supports a plurality of service types. In this case, the terminal device may require different scheduling requests. Therefore, different scheduling requests sent by the terminal device may collide in time domain. The collision of scheduling requests in time domain is a problem to be resolved urgently.

SUMMARY

An exemplary embodiment provides a method for determining priorities of scheduling requests, a terminal device, and a base station, to select a scheduling request for sending to a base station when a collision occurs between time domain resources of two scheduling requests.

According to a first aspect, an embodiment provides a method for determining priorities of scheduling requests, where the method includes: determining, by a terminal device, that a first time domain resource collides with a second time domain resource, where the first time domain resource is used to transmit a first scheduling request, and the second time domain resource is used to transmit a second scheduling request; determining, by the terminal device, a priority of the first scheduling request and a priority of the second scheduling request according to first priority information of the first scheduling request and first priority information of the second scheduling request, where the first priority information of the scheduling requests is any one or more of the following information: symbol duration information of the scheduling requests, transmission durations of the scheduling requests, quantities of unsuccessful transmissions of the scheduling requests, and whether the scheduling requests use orthogonal cover codes (OCCs), and the symbol duration information of the scheduling requests is used to indicate a duration of each symbol carrying the scheduling requests; and when determining that the priority of the first scheduling request is higher than the priority of the second scheduling request, sending, by the terminal device, the first scheduling request to a base station; or when determining that the priority of the first scheduling request is lower than the priority of the second scheduling request, sending, by the terminal device, the second scheduling request to the base station. According to the foregoing technical solution, the terminal device can select a scheduling request for sending to the base station when a collision occurs between the time domain resources of the two scheduling requests. Therefore, the collision between the time domain resources of the two scheduling requests is resolved.

With reference to the first aspect, in a first possible implementation of the first aspect, the determining, by a terminal device, that a first time domain resource collides with a second time domain resource includes: determining, by the terminal device, that a start time of the first time domain resource is the same as a start time of the second time domain resource. According to the foregoing technical solution, the terminal device can determine the priorities of the scheduling requests when the collision occurs.

With reference to the first aspect, in a second possible implementation of the first aspect, the determining, by a terminal device, that a first time domain resource collides with a second time domain resource includes: determining, by the terminal device before a first time or at the first time, that a start time of one of the first time domain resource and the second time domain resource is later than a start time of the other time domain resource and earlier than an end time of the other time domain resource, where the first time is the start time of the other time domain resource. According to the foregoing technical solution, the terminal device can predetermine the collision between the two scheduling requests in time domain, and therefore can predetermine the priorities of the scheduling requests.

With reference to one of the first aspect, the first possible implementation of the first aspect, or the second possible implementation of the first aspect, in a third possible implementation of the first aspect, when the first priority information of the scheduling requests is the symbol duration information of the scheduling requests, the determining, by the terminal device, a priority of the first scheduling request and a priority of the second scheduling request according to first priority information of the first scheduling request and first priority information of the second scheduling request includes: when determining that a duration of each symbol carrying the first scheduling request is shorter than a duration of each symbol carrying the second scheduling request, determining, by the terminal device, that the priority of the first scheduling request is higher than the priority of the second scheduling request; or when determining that a duration of each symbol carrying the first scheduling request is longer than a duration of each symbol carrying the second scheduling request, determining, by the terminal device, that the priority of the first scheduling request is lower than the priority of the second scheduling request. According to the foregoing technical solution, the terminal device can determine priorities of different scheduling requests according to durations of symbols used to carry the scheduling requests.

With reference to one of the first aspect, the first possible implementation of the first aspect, or the second possible implementation of the first aspect, in a fourth possible implementation of the first aspect, when the first priority information of the scheduling requests is the symbol duration information of the scheduling requests, the determining, by the terminal device, a priority of the first scheduling request and a priority of the second scheduling request according to first priority information of the first scheduling request and first priority information of the second scheduling request includes: when determining that a spacing between subcarriers used to carry the first scheduling request is greater than a spacing between subcarriers used to carry the second scheduling request, determining, by the terminal device, that the priority of the first scheduling request is higher than the priority of the second scheduling request; or when determining that a spacing between carriers used to carry the first scheduling request is less than a spacing between subcarriers used to carry the second scheduling request, determining, by the terminal device, that the priority of the second scheduling request is higher than the priority of the first scheduling request. According to the foregoing technical solution, the terminal device can determine priorities of different scheduling requests according to spacings between subcarriers used to carry the scheduling requests.

With reference to one of the first aspect, the first possible implementation of the first aspect, or the second possible implementation of the first aspect, in a fifth possible implementation of the first aspect, when the first priority information of the scheduling requests is the transmission durations of the scheduling requests, the determining, by the terminal device, a priority of the first scheduling request and a priority of the second scheduling request according to first priority information of the first scheduling request and first priority information of the second scheduling request includes: when determining that a transmission duration of the first scheduling request is shorter than a transmission duration of the second scheduling request, determining, by the terminal device, that the priority of the first scheduling request is higher than the priority of the second scheduling request; or when determining that a transmission duration of the first scheduling request is longer than a transmission duration of the second scheduling request, determining, by the terminal device, that the priority of the first scheduling request is lower than the priority of the second scheduling request. According to the foregoing technical solution, the terminal device can determine priorities of different scheduling requests according to transmission durations of the scheduling requests.

With reference to one of the first aspect, the first possible implementation of the first aspect, or the second possible implementation of the first aspect, in a sixth possible implementation of the first aspect, when the first priority information of the scheduling requests is the quantities of unsuccessful transmissions of the scheduling requests, the determining, by the terminal device, a priority of the first scheduling request and a priority of the second scheduling request according to first priority information of the first scheduling request and first priority information of the second scheduling request includes: when determining that a quantity of unsuccessful transmissions of the first scheduling request is greater than a quantity of unsuccessful transmissions of the second scheduling request, determining, by the terminal device, that the priority of the first scheduling request is higher than the priority of the second scheduling request; or when determining that a quantity of unsuccessful transmissions of the first scheduling request is less than a quantity of unsuccessful transmissions of the second scheduling request, determining, by the terminal device, that the priority of the first scheduling request is lower than the priority of the second scheduling request. According to the foregoing technical solution, the terminal device can determine priorities of different scheduling requests according to quantities of unsuccessful transmissions of the scheduling requests.

With reference to one of the first aspect, the first possible implementation of the first aspect, or the second possible implementation of the first aspect, in a seventh possible implementation of the first aspect, the method further includes: determining, by the terminal device, second priority information of the first scheduling request and second priority information of the second scheduling request, where the second priority information of the scheduling requests includes periods of the scheduling requests; and the determining, by the terminal device, a priority of the first scheduling request and a priority of the second scheduling request according to first priority information of the first scheduling request and first priority information of the second scheduling request includes: determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request. According to the foregoing technical solution, the terminal device can determine priorities of different scheduling requests according to one or more pieces of information of the periods and the first priority information of the scheduling requests.

With reference to the seventh possible implementation of the first aspect, in an eighth possible implementation of the first aspect, when the first priority information of the scheduling requests is the symbol duration information of the scheduling requests, the transmission durations of the scheduling requests, and the quantities of unsuccessful transmissions of the scheduling requests, the determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request includes: when determining that a quantity of unsuccessful transmissions of the first scheduling request is equal to a preset threshold and a quantity of unsuccessful transmissions of the second scheduling request is less than the preset threshold, determining, by the terminal device, that the priority of the first scheduling request is higher than the priority of the second scheduling request; when determining that a quantity of unsuccessful transmissions of the first scheduling request is less than the preset threshold and a quantity of unsuccessful transmissions of the second scheduling request is equal to the preset threshold, determining, by the terminal device, that the priority of the first scheduling request is lower than the priority of the second scheduling request; or when determining that a quantity of unsuccessful transmissions of the first scheduling request and a quantity of unsuccessful transmissions of the second scheduling request are both equal to the preset threshold or are both unequal to the preset threshold, determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request. Based on the foregoing technical solution, when a quantity of retransmissions of a scheduling request reaches or will reach a maximum quantity of retransmissions, the terminal device can preferentially send the scheduling request to the base station. Therefore, random access reinitiated because the maximum quantity of retransmissions is exceeded can be avoided.

With reference to one of the first aspect, the first possible implementation of the first aspect, or the second possible implementation of the first aspect, in a ninth possible implementation of the first aspect, when the first priority information of the scheduling requests is whether the scheduling requests use the OCCs, the determining, by the terminal device, a priority of the first scheduling request and a priority of the second scheduling request according to first priority information of the first scheduling request and first priority information of the second scheduling request includes: when determining that at least one of the first scheduling request and the second scheduling request uses the OCC, determining, by the terminal device, a type of a first uplink control channel and a type of a second uplink control channel, where the first uplink control channel is used to carry the first scheduling request, and the second uplink control channel is used to carry the second scheduling request; and when determining that the type of the first uplink control channel is a long physical uplink control channel, and the type of the second uplink control channel is a one-symbol short physical uplink control channel, and a time domain location of a first symbol on the first uplink control channel or a time domain location of a first symbol in a frequency hopping part of the first uplink control channel is the same as a time domain location of a first symbol on the second uplink control channel, determining, by the terminal device, that the priority of the second scheduling request is higher than the priority of the first scheduling request; when determining that the type of the first uplink control channel is the long physical uplink control channel, and the type of the second uplink control channel is the one-symbol short physical uplink control channel, and a time domain location of any symbol other than a first symbol on the first uplink control channel and a first symbol in a frequency hopping part thereof is the same as a time domain location of a first symbol on the second uplink control channel, determining, by the terminal device, that the priority of the first scheduling request is higher than the priority of the second scheduling request; or when determining that the type of the first uplink control channel is the long physical uplink control channel, and the type of the second uplink control channel is a two-symbol short physical uplink control channel, and a time domain location of a first symbol on the first uplink control channel or a time domain location of a first symbol in a frequency hopping part of the first uplink control channel is the same as a time domain location of a second symbol on the second uplink control channel, and the first scheduling request uses the OCC, determining, by the terminal device, that the priority of the first scheduling request is lower than the priority of the second scheduling request. According to the foregoing technical solution, the terminal device can determine priorities of different scheduling requests according to whether the OCC is used. In addition, the terminal device can further avoid interfering with other terminal devices.

With reference to any one of the first aspect, or the first possible implementation of the first aspect to the eighth possible implementation of the first aspect, in a tenth possible implementation of the first aspect, the method further includes: when a type of a first uplink control channel is a long physical uplink control channel, and a type of a second uplink control channel is a short physical uplink control channel, and the priority of the first scheduling request is higher than the priority of the second scheduling request, sending, by the terminal device, the second scheduling request to the base station, where the first uplink control channel is used to carry the first scheduling request, and the second uplink control channel is used to carry the second scheduling request; or when the type of the first uplink control channel is the long physical uplink control channel, and the type of the second uplink control channel is the short physical uplink control channel, and the priority of the first scheduling request is lower than the priority of the second scheduling request, and when determining that the symbol used to transmit the first scheduling request can carry a demodulation reference signal and uplink control information, sending, by the terminal device, the first scheduling request to the base station. According to the foregoing technical solution, the terminal device may further send a scheduling request of a lower priority.

With reference to the ninth possible implementation of the first aspect, in an eleventh possible implementation of the first aspect, the method further includes: when the type of the first uplink control channel is the long physical uplink control channel, and the type of the second uplink control channel is the one-symbol short physical uplink control channel, and the priority of the second scheduling request is higher than the priority of the first scheduling request, and the symbol used to transmit the first scheduling request can carry a demodulation reference signal and uplink control information, sending, by the terminal device, a part of the first scheduling request carried by a first frequency resource, where the first frequency domain resource is different from a second frequency domain resource, and the second frequency domain resource is a frequency domain resource used to transmit the second scheduling request; or when the type of the first uplink control channel is the long physical uplink control channel, and the type of the second uplink control channel is the one-symbol short physical uplink control channel, and the priority of the second scheduling request is lower than the priority of the first scheduling request, sending, by the terminal device, the second scheduling request to the base station. According to the foregoing technical solution, the terminal device may further send a scheduling request of a lower priority.

According to a second aspect, an embodiment provides a method for determining priorities of scheduling requests, where the method includes: determining, by a terminal device before a start time of a first time domain resource, that a start time of a second time domain resource is equal to or later than the start time of the first time domain resource and the start time of the second time domain resource is earlier than an end time of the first time domain resource, where the first time domain resource is used to transmit a first scheduling request, and the second time domain resource is used to transmit a second scheduling request; determining, by the terminal device, a priority of the first scheduling request and a priority of the second scheduling request according to priority information of the first scheduling request and priority information of the second scheduling request, where the priority information of the scheduling requests is any one or more of the following information: service types of the scheduling requests and periods of the scheduling requests; and when determining that the priority of the first scheduling request is higher than the priority of the second scheduling request, sending, by the terminal device, the first scheduling request to a base station; or when determining that the priority of the first scheduling request is lower than the priority of the second scheduling request, sending, by the terminal device, the second scheduling request to the base station. According to the foregoing technical solution, the terminal device can predetermine a collision between the two scheduling requests in time domain, and therefore can predetermine the priorities of the scheduling requests.

With reference to the second aspect, in a first possible implementation of the second aspect, when the priority information of the scheduling requests is the service types of the scheduling requests, the determining, by the terminal device, a priority of the first scheduling request and a priority of the second scheduling request according to priority information of the first scheduling request and priority information of the second scheduling request includes: when determining that a service type of the first scheduling request is ultra-reliable low-latency communication (URLLC) and a service type of the second scheduling request is enhanced mobile broadband, determining, by the terminal device, that the priority of the first scheduling request is higher than the priority of the second scheduling request; or when determining that a service type of the second scheduling request is URLLC and a service type of the first scheduling request is enhanced mobile broadband, determining, by the terminal device, that the priority of the second scheduling request is higher than the priority of the first scheduling request. According to the foregoing technical solution, the terminal device can determine priorities of different scheduling requests according to service types of the scheduling requests.

With reference to the second aspect, in a second possible implementation of the second aspect, when the priority information of the scheduling requests is the periods of the scheduling requests, the determining, by the terminal device, a priority of the first scheduling request and a priority of the second scheduling request according to priority information of the first scheduling request and priority information of the second scheduling request includes: when determining that a period of the first scheduling request is shorter than a period of the second scheduling request, determining, by the terminal device, that the priority of the first scheduling request is higher than the priority of the second scheduling request; or when determining that a period of the second scheduling request is shorter than a period of the first scheduling request, determining, by the terminal device, that the priority of the second scheduling request is higher than the priority of the first scheduling request. According to the foregoing technical solution, the terminal device can determine priorities of different scheduling requests according to periods of the scheduling requests.

With reference to the second aspect, in a third possible implementation of the second aspect, when the priority information of the scheduling requests is the service types of the scheduling requests and the periods of the scheduling requests, the determining, by the terminal device, a priority of the first scheduling request and a priority of the second scheduling request according to priority information of the first scheduling request and priority information of the second scheduling request includes: when determining that a service type of the first scheduling request is URLLC and a service type of the second scheduling request is enhanced mobile broadband, determining, by the terminal device, that the priority of the first scheduling request is higher than the priority of the second scheduling request; when determining that a service type of the second scheduling request is URLLC and a service type of the first scheduling request is enhanced mobile broadband, determining, by the terminal device, that the priority of the second scheduling request is higher than the priority of the first scheduling request; when determining that a service type of the first scheduling request is the same as a service type of the second scheduling request and a period of the first scheduling request is shorter than a period of the second scheduling request, determining, by the terminal device, that the priority of the first scheduling request is higher than the priority of the second scheduling request; or when determining that a service type of the first scheduling request is the same as a service type of the second scheduling request and a period of the first scheduling request is longer than a period of the second scheduling request, determining, by the terminal device, that the priority of the first scheduling request is lower than the priority of the second scheduling request. According to the foregoing technical solution, when the terminal device cannot determine priorities of different scheduling requests according to service types of the scheduling requests, the terminal device can determine the priorities of the different scheduling requests according to periods of the scheduling requests.

According to a third aspect, an embodiment provides a method for determining priorities of scheduling requests, where the method includes: receiving, by a terminal device, first priority indication information and second priority indication information sent by a base station, where the first priority indication information is used to indicate a priority of a first scheduling request, and the second priority indication information is used to indicate a priority of a second scheduling request; and when determining that a resource used to transmit the first scheduling request collides with a resource used to transmit the second scheduling request and the priority of the first scheduling request is higher than the priority of the second scheduling request, sending, by the terminal device, the first scheduling request to the base station; or when determining that a resource used to transmit the first scheduling request collides with a resource used to transmit the second scheduling request and the priority of the first scheduling request is lower than the priority of the second scheduling request, and when sending the second scheduling request to the base station, sending, by the terminal device, the scheduling request of the higher priority in the first scheduling request and the second scheduling request to the base station. According to the foregoing technical solution, the terminal device can determine the priorities of the scheduling requests directly according to an indication from the base station.

According to a fourth aspect, an embodiment provides a method for determining priorities of scheduling requests, where the method includes: determining, by a base station, a priority of a first scheduling request and a priority of a second scheduling request according to priority information of the first scheduling request and priority information of the second scheduling request, where the priority information of the scheduling requests is any one or more of the following information: symbol duration information of the scheduling requests, transmission durations of the scheduling requests, whether the scheduling requests use OCCs, service types of the scheduling requests, and periods of the scheduling requests, and the symbol duration information of the scheduling requests is used to indicate a duration of each symbol carrying the scheduling requests; and sending, by the base station, first priority indication information and second priority indication information to a terminal device, where the first priority indication information is used to indicate the priority of the first scheduling request, and the second priority indication information is used to indicate the priority of the second scheduling request. According to the foregoing technical solution, the base station may predetermine the priorities of the scheduling requests, and send the scheduling requests to the terminal device, so that the terminal device can determine the priorities of the scheduling requests directly according to an indication from the base station.

With reference to the fourth aspect, in a first possible implementation of the fourth aspect, when the priority information of the scheduling requests is the symbol duration information of the scheduling requests, the determining, by a base station, a priority of a first scheduling request and a priority of a second scheduling request according to priority information of the first scheduling request and priority information of the second scheduling request includes: when determining that a duration of each symbol carrying the first scheduling request is shorter than a duration of each symbol carrying the second scheduling request, determining, by the base station, that the priority of the first scheduling request is higher than the priority of the second scheduling request; or when determining that a duration of each symbol carrying the first scheduling request is longer than a duration of each symbol carrying the second scheduling request, determining, by the base station, that the priority of the first scheduling request is lower than the priority of the second scheduling request. According to the foregoing technical solution, the base station can determine priorities of different scheduling requests according to durations of symbols used to carry the scheduling requests.

With reference to the fourth aspect, in a second possible implementation of the fourth aspect, when the priority information of the scheduling requests is the symbol duration information of the scheduling requests, the determining, by a base station, a priority of the first scheduling request and a priority of the second scheduling request according to priority information of the first scheduling request and priority information of the second scheduling request includes: when determining that a spacing between subcarriers used to carry the first scheduling request is greater than a spacing between subcarriers used to carry the second scheduling request, determining, by the base station, that the priority of the first scheduling request is higher than the priority of the second scheduling request; or when determining that a spacing between carriers used to carry the first scheduling request is less than a spacing between subcarriers used to carry the second scheduling request, determining, by the base station, that the priority of the second scheduling request is higher than the priority of the first scheduling request. According to the foregoing technical solution, the base station can determine priorities of different scheduling requests according to spacings between subcarriers used to carry the scheduling requests.

With reference to the fourth aspect, in a third possible implementation of the fourth aspect, when the priority information of the scheduling requests is the transmission durations of the scheduling requests, the determining, by a base station, a priority of the first scheduling request and a priority of the second scheduling request according to priority information of the first scheduling request and priority information of the second scheduling request includes: when determining that a transmission duration of the first scheduling request is shorter than a transmission duration of the second scheduling request, determining, by the base station, that the priority of the first scheduling request is higher than the priority of the second scheduling request; or when determining that a transmission duration of the first scheduling request is longer than a transmission duration of the second scheduling request, determining, by the base station, that the priority of the first scheduling request is lower than the priority of the second scheduling request. According to the foregoing technical solution, the base station can determine priorities of different scheduling requests according to transmission durations of the scheduling requests.

With reference to the fourth aspect, in a fourth possible implementation of the fourth aspect, when the priority information of the scheduling requests is whether the OCCs are used, the determining, by a base station, a priority of the first scheduling request and a priority of the second scheduling request according to priority information of the first scheduling request and priority information of the second scheduling request includes: when determining that at least one of the first scheduling request and the second scheduling request uses the OCC, determining, by the base station, a type of a first uplink control channel and a type of a second uplink control channel, where the first uplink control channel is used to carry the first scheduling request, and the second uplink control channel is used to carry the second scheduling request; and when determining that the type of the first uplink control channel is a long physical uplink control channel, and the type of the second uplink control channel is a one-symbol short physical uplink control channel, and a time domain location of a first symbol on the first uplink control channel or a time domain location of a first symbol in a frequency hopping part of the first uplink control channel is the same as a time domain location of a first symbol on the second uplink control channel, determining, by the base station, that the priority of the second scheduling request is higher than the priority of the first scheduling request; when determining that the type of the first uplink control channel is the long physical uplink control channel, and the type of the second uplink control channel is the one-symbol short physical uplink control channel, and a time domain location of any symbol other than a first symbol on the first uplink control channel and a first symbol in a frequency hopping part thereof is the same as a time domain location of a first symbol on the second uplink control channel, determining, by the base station, that the priority of the first scheduling request is higher than the priority of the second scheduling request; or when determining that the type of the first uplink control channel is the long physical uplink control channel, and the type of the second uplink control channel is a two-symbol short physical uplink control channel, and a time domain location of a first symbol on the first uplink control channel or a time domain location of a first symbol in a frequency hopping part of the first uplink control channel is the same as a time domain location of a second symbol on the second uplink control channel, and the first scheduling request uses the OCC, determining, by the base station, that the priority of the first scheduling request is lower than the priority of the second scheduling request. According to the foregoing technical solution, the base station can determine priorities of different scheduling requests according to whether the OCC is used. In addition, the terminal device can be enabled to further avoid interfering with other terminal devices.

With reference to the fourth aspect, in a fifth possible implementation of the fourth aspect, when the priority information of the scheduling requests is the service types of the scheduling requests, the determining, by a base station, a priority of the first scheduling request and a priority of the second scheduling request according to priority information of the first scheduling request and priority information of the second scheduling request includes: when determining that a service type of the first scheduling request is URLLC and a service type of the second scheduling request is enhanced mobile broadband, determining, by the base station, that the priority of the first scheduling request is higher than the priority of the second scheduling request; or when determining that a service type of the second scheduling request is URLLC and a service type of the first scheduling request is enhanced mobile broadband, determining, by the base station, that the priority of the second scheduling request is higher than the priority of the first scheduling request. According to the foregoing technical solution, the base station can determine priorities of different scheduling requests according to services types of the scheduling requests.

With reference to the fourth aspect, in a sixth possible implementation of the fourth aspect, when the priority information of the scheduling requests is the periods of the scheduling requests, the determining, by a base station, a priority of the first scheduling request and a priority of the second scheduling request according to priority information of the first scheduling request and priority information of the second scheduling request includes: when determining that a period of the first scheduling request is shorter than a period of the second scheduling request, determining, by the base station, that the priority of the first scheduling request is higher than the priority of the second scheduling request; or when determining that a period of the second scheduling request is shorter than a period of the first scheduling request, determining, by the base station, that the priority of the second scheduling request is higher than the priority of the first scheduling request. According to the foregoing technical solution, the base station can determine priorities of different scheduling requests according to periods of the scheduling requests.

According to a fifth aspect, an embodiment provides a terminal device, where the terminal device includes units for performing the method in any one of the first aspect or the possible implementations of the first aspect.

According to a sixth aspect, an embodiment provides a terminal device, where the terminal device includes units for performing the method in any one of the second aspect or the possible implementations of the second aspect.

According to a seventh aspect, an embodiment provides a terminal device, where the terminal device includes units for performing the method in the third aspect.

According to an eighth aspect, an embodiment provides a base station, where the base station includes units for performing the method in any one of the fourth aspect or the possible implementations of the fourth aspect.

According to a ninth aspect, an embodiment provides a terminal device, where the terminal device includes a processor, a memory, and a transceiver. The processor executes an instruction stored in the memory, and implements the method in any one of the first aspect or the possible implementations of the first aspect in combination with the transceiver.

According to a tenth aspect, an embodiment provides a terminal device, where the terminal device includes a processor, a memory, and a transceiver. The processor executes an instruction stored in the memory, and implements the method in any one of the second aspect or the possible implementations of the second aspect in combination with the transceiver.

According to an eleventh aspect, an embodiment provides a terminal device, where the terminal device includes a processor, a memory, and a transceiver. The processor executes an instruction stored in the memory, and implements the method in the third aspect in combination with the transceiver.

According to a twelfth aspect, an embodiment provides a base station, where the base station includes a processor, a memory, and a transceiver. The processor executes an instruction stored in the memory, and implements the method in any one of the fourth aspect or the possible implementations of the fourth aspect in combination with the transceiver.

According to a thirteenth aspect, an embodiment further provides a computer storage medium storing a computer program, where the computer program is used to perform the steps of the method in any one of the first aspect or the possible implementations of the first aspect.

According to a fourteenth aspect, an embodiment further provides a computer storage medium storing a computer program, where the computer program is used to perform the steps of the method in any one of the second aspect or the possible implementations of the second aspect.

According to a fifteenth aspect, an embodiment further provides a computer storage medium storing a computer program, where the computer program is used to perform the steps of the method in the third aspect.

According to a sixteenth aspect, an embodiment further provides a computer storage medium storing a computer program, where the computer program is used to perform the steps of the method in any one of the fourth aspect or the possible implementations of the fourth aspect.

According to a seventeenth aspect, an embodiment further provides a computer program product including an instruction, and when the computer program product runs on a computer, the computer performs the steps of the method in any one of the first aspect or the possible implementations of the first aspect.

According to an eighteenth aspect, an embodiment further provides a computer program product including an instruction, and when the computer program product runs on a computer, the computer performs the steps of the method in any one of the second aspect or the possible implementations of the second aspect.

According to a nineteenth aspect, an embodiment further provides a computer program product including an instruction, and when the computer program product runs on a computer, the computer performs the steps of the method in the third aspect.

According to a twentieth aspect, an embodiment further provides a computer program product including an instruction, and when the computer program product runs on a computer, the computer performs the steps of the method in any one of the fourth aspect or the possible implementations of the fourth aspect.

DESCRIPTION OF EMBODIMENTS

The following describes the technical solutions in embodiments with reference to the accompanying drawings.

The technical solutions in embodiments may be applied to a 5G new radio system, a future evolved public land mobile network (PLMN) system, or the like.

A terminal device in the embodiments may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G new radio network, a terminal device in a future evolved PLMN, or the like. This is not limited in the embodiments.

A base station in the embodiments may be a base station in the 5G new radio system, a base station in the future evolved PLMN network, or the like. This is not limited in the embodiments.

That time domain resources of two scheduling requests collide in the embodiments may be that the resources completely collide or partially collide. That two time domain resources completely collide is that one of the two time domain resources is completely located in a range of the other time domain resource. That two time domain resources partially collide is that a part of one of the two time domain resources is located in the other time domain resource.

Figure 1:
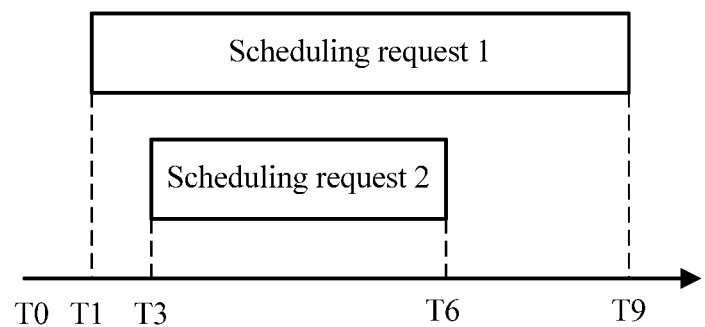
FIG. 1 is a schematic diagram in which time domain resources of two scheduling requests completely collide.

FIG. 1 is a schematic diagram in which time domain resources of two scheduling requests completely collide. As shown in FIG. 1, a start time of a first time domain resource of a scheduling request 1 is a time T1, and an end time thereof is a time T9; a start time of a time domain resource of a scheduling request 2 is a time T3, and an end time thereof is a time T6. As shown in FIG. 1, the second time domain resource is completely located in the first time domain resource. In this case, the first time domain resource of the scheduling request 1 and the second time domain resource of the scheduling request 2 completely collide.

Figure 2:
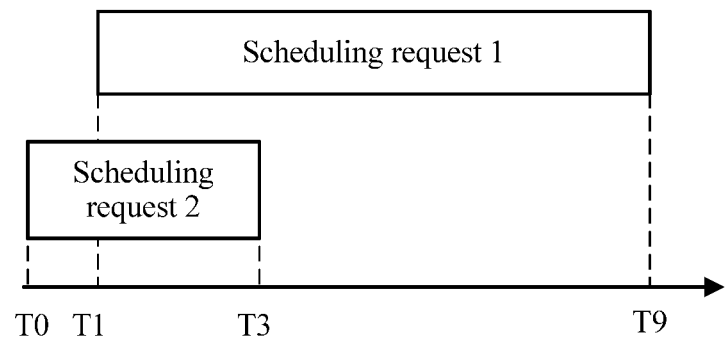
FIG. 2 is a schematic diagram in which time domain resources of two scheduling requests partially collide.

FIG. 2 is a schematic diagram in which time domain resources of two scheduling requests partially collide. As shown in FIG. 2, a start time of a time domain resource of a scheduling request 1 is a time T1, and an end time thereof is a time T9; a start time of a time domain resource of a scheduling request 2 is a time T0, and an end time thereof is a time T3. As shown in FIG. 2, the second time domain resource is partially located in the first time domain resource. In this case, the first time domain resource of the scheduling request 1 and the second time domain resource of the scheduling request 2 partially collide.

Figure 3:
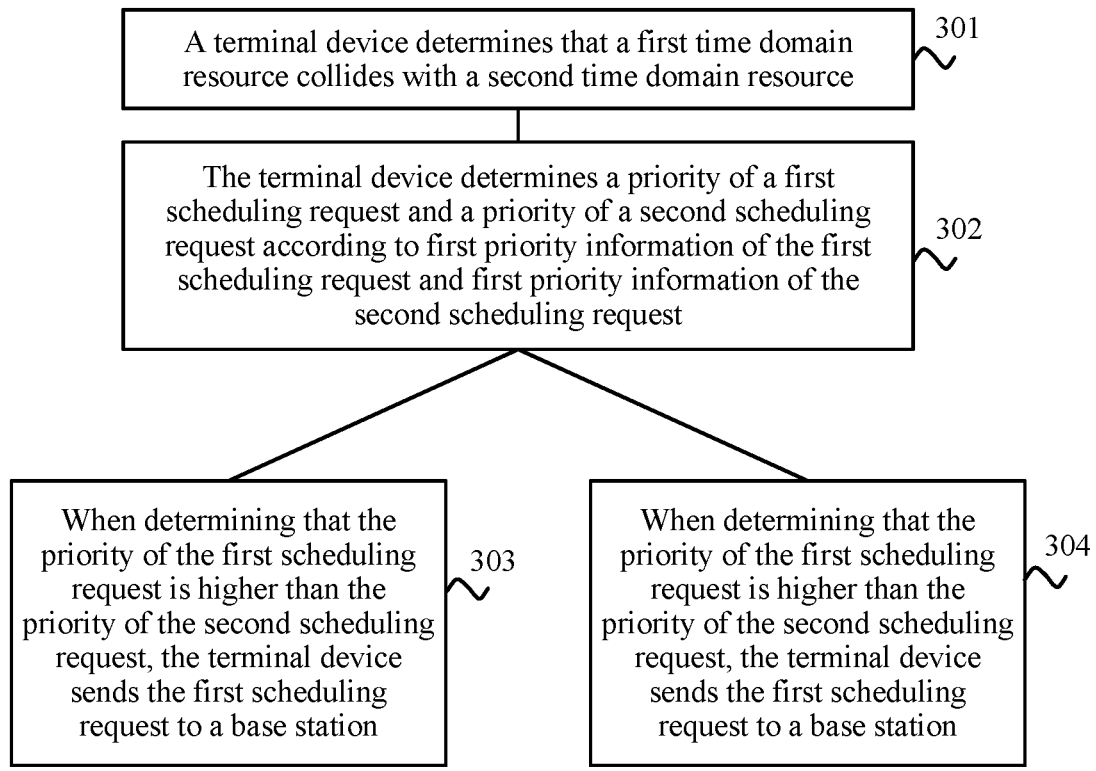
FIG. 3 is a schematic flowchart of a method for determining priorities of scheduling requests according to an embodiment.

FIG. 3 is a schematic flowchart of a method for determining priorities of scheduling requests according to an embodiment.

In step 301, a terminal device determines that a first time domain resource collides with a second time domain resource, where the first time domain resource is a time domain resource used to transmit a first scheduling request, and the second time domain resource is a time domain resource used to transmit a second scheduling request.

In step 302, the terminal device determines a priority of the first scheduling request and a priority of the second scheduling request according to first priority information of the first scheduling request and first priority information of the second scheduling request, where the first priority information of the time domain resources is any one or more of symbol duration information of the scheduling requests, transmission durations of the scheduling requests, quantities of unsuccessful transmissions of the scheduling requests, and whether the scheduling requests use orthogonal cover codes, and the symbol duration information of the scheduling requests is used to indicate a duration of each symbol carrying the scheduling requests.

In step 303, when determining that the priority of the first scheduling request is higher than the priority of the second scheduling request, the terminal device sends the first scheduling request to a base station.

In step 304, when determining that the priority of the second scheduling request is higher than the priority of the first scheduling request, the terminal device sends the second scheduling request to the base station.

According to the technical solution shown in FIG. 3, the terminal device can determine the priorities of the two scheduling requests according to one or more of the symbol duration information of the scheduling requests, the transmission durations of the scheduling requests, the quantities of unsuccessful transmissions of the scheduling requests, and whether the scheduling requests use the orthogonal cover codes, to determine a scheduling request that can be sent to the base station. In this way, when the time domain resources of the two scheduling requests collide, the terminal device can select an appropriate scheduling request for sending to the base station.

Optionally, in some embodiments, that a terminal device determines that a first time domain resource collides with a second time domain resource includes: the terminal device determines that a start time of the first time domain resource is the same as a start time of the second time domain resource. In the foregoing technical solution, when the terminal device requires two scheduling requests and determines that start times of time domain resources for transmitting the two scheduling requests are the same, the terminal device can determine that the two time domain resources collide. For ease of description, this rule for determining that time domain resources of two scheduling requests collide is hereinafter referred to as a real-time determining rule.

Optionally, in other embodiments, that a terminal device determines that a first time domain resource collides with a second time domain resource includes: the terminal device determines, before a first time or at the first time, that a start time of one of the first time domain resource and the second time domain resource is later than a start time of the other time domain resource and earlier than an end time of the other time domain resource, where the first time is the start time of the other time domain resource. In the foregoing technical solution, when the terminal device requires one scheduling request and determines a time domain resource for transmitting the scheduling request, the terminal device may determine whether the other scheduling request is required in a time range of the time domain resource of the scheduling request and a start time of the time domain resource of the other scheduling request is in the time range of the time domain resource of the scheduling request. For ease of description, this rule for determining that time domain resources of two scheduling requests collide is hereinafter referred to as a predetermining rule.

Optionally, in some embodiments, the first priority information of the scheduling requests may be any one of the symbol duration information of the scheduling requests, the transmission durations of the scheduling requests, the quantities of unsuccessful transmissions of the scheduling requests, and whether the scheduling requests use the OCC.

Optionally, in some embodiments, the first priority information of the scheduling requests is the symbol duration information of the scheduling requests. In this case, that the terminal device determines a priority of the first scheduling request and a priority of the second scheduling request according to first priority information of the first scheduling request and first priority information of the second scheduling request includes: when determining that a duration of each symbol carrying the first scheduling request is shorter than a duration of each symbol carrying the second scheduling request, the terminal device determines that the priority of the first scheduling request is higher than the priority of the second scheduling request; or when determining that a duration of each symbol carrying the first scheduling request is longer than a duration of each symbol carrying the second scheduling request, the terminal device determines that the priority of the first scheduling request is lower than the priority of the second scheduling request.

Optionally, in some embodiments, the symbol duration information of the scheduling requests may be the duration of each symbol used to carry the scheduling requests. In this case, the symbol duration information of the scheduling requests may directly indicate the duration of each symbol used to carry the scheduling requests.

Different spacings between subcarriers correspond to different symbol durations. Therefore, in other embodiments, the symbol duration information of the scheduling requests may be spacings between subcarriers used to carry the scheduling requests. In other words, the symbol duration information of the scheduling requests may indirectly indicate, by using the spacings between subcarriers used to carry the scheduling requests, the duration of each symbol used to carry the scheduling requests. In this case, the terminal device may determine the priority of the first scheduling request and the priority of the second scheduling request according to a spacing between subcarriers used to carry the first scheduling request and a spacing between subcarriers used to carry the second scheduling request. When determining that the spacing between subcarriers used to carry the first scheduling request is greater than the spacing between subcarriers used to carry the second scheduling request, the terminal device determines that the priority of the first scheduling request is higher than the priority of the second scheduling request; or when determining that the spacing between carriers used to carry the first scheduling request is less than the spacing between subcarriers used to carry the second scheduling request, the terminal device determines that the priority of the second scheduling request is higher than the priority of the first scheduling request.

Optionally, in some embodiments, the first priority information of the scheduling requests is the transmission durations of the scheduling requests. In this case, that the terminal device determines a priority of the first scheduling request and a priority of the second scheduling request according to first priority information of the first scheduling request and first priority information of the second scheduling request includes: when determining that a transmission duration of the first scheduling request is shorter than a transmission duration of the second scheduling request, the terminal device determines that the priority of the first scheduling request is higher than the priority of the second scheduling request; or when determining that a transmission duration of the first scheduling request is longer than a transmission duration of the second scheduling request, the terminal device determines that the priority of the first scheduling request is lower than the priority of the second scheduling request.

Optionally, in some embodiments, the first priority information of the scheduling requests is the quantities of unsuccessful transmissions of the scheduling requests. In this case, that the terminal device determines a priority of the first scheduling request and a priority of the second scheduling request according to first priority information of the first scheduling request and first priority information of the second scheduling request includes: when determining that a quantity of unsuccessful transmissions of the first scheduling request is greater than a quantity of unsuccessful transmissions of the second scheduling request, the terminal device determines that the priority of the first scheduling request is higher than the priority of the second scheduling request; or when determining that a quantity of unsuccessful transmissions of the first scheduling request is less than a quantity of unsuccessful transmissions of the second scheduling request, the terminal device determines that the priority of the first scheduling request is lower than the priority of the second scheduling request.

It may be understood that, in this embodiment, a quantity of unsuccessful transmissions of a scheduling request is not greater than a maximum quantity of unsuccessful transmissions of the scheduling request.

Optionally, in some embodiments, the first priority information of the scheduling requests is whether the scheduling requests use the orthogonal cover codes. In this case, that the terminal device determines a priority of the first scheduling request and a priority of the second scheduling request according to first priority information of the first scheduling request and first priority information of the second scheduling request includes: when determining that at least one of the first scheduling request and the second scheduling request uses the OCC, the terminal device determines a type of a first uplink control channel and a type of a second uplink control channel, where the first uplink control channel is used to carry the first scheduling request, and the second uplink control channel is used to carry the second scheduling request; and when determining that the type of the first uplink control channel is a long physical uplink control channel, and the type of the second uplink control channel is a one-symbol short physical uplink control channel or a two-symbol short physical uplink control channel, and a time domain location of a first symbol on the first uplink control channel or a time domain location of a first symbol in a frequency hopping part of the first uplink control channel is the same as a time domain location of a first symbol on the second uplink control channel, the terminal device determines that the priority of the second scheduling request is higher than the priority of the first scheduling request; when determining that the type of the first uplink control channel is the long physical uplink control channel, and the type of the second uplink control channel is the one-symbol short physical uplink control channel or a two-symbol short physical uplink control channel, and a time domain location of any symbol other than a first symbol on the first uplink control channel and a first symbol in a frequency hopping part thereof is the same as a time domain location of a first symbol on the second uplink control channel, the terminal device determines that the priority of the first scheduling request is higher than the priority of the second scheduling request; or when determining that the type of the first uplink control channel is the long physical uplink control channel, and the type of the second uplink control channel is a two-symbol short physical uplink control channel, and a time domain location of a first symbol on the first uplink control channel or a time domain location of a first symbol in a frequency hopping part of the first uplink control channel is the same as a time domain location of a second symbol on the second uplink control channel, and the first scheduling request uses the OCC, the terminal device determines that the priority of the first scheduling request is lower than the priority of the second scheduling request. Still further, when determining that the type of the first uplink control channel is the two-symbol short physical uplink control channel and the type of the second uplink control channel is the one-symbol short physical uplink control channel, and a time domain location of a second symbol on the first uplink control channel is the same as a time domain location of a symbol on the second uplink control channel, the terminal device may further determine that the priority of the first scheduling request is higher than the priority of the second scheduling request. For ease of description, the manner in which the terminal device determines the priority of the first scheduling request and the priority of the second scheduling request according to the first priority information of the first scheduling request and the first priority information of the second scheduling request when the first priority information of the scheduling requests is whether the scheduling requests use the OCCs is hereinafter referred to as "the terminal device determines the priority of the first scheduling request and the priority of the second scheduling request according to whether the OCCs are used".

Some cases are not included in an exemplary implementation of determining the priority of the first scheduling request and the priority of the second scheduling request when the scheduling requests include only whether the scheduling requests use the OCCs. For example, assuming that the terminal device determines that one of the first scheduling request and the second scheduling request uses the OCC, the terminal device cannot determine the priority of the first scheduling request and the priority of the second scheduling request when determining that both the type of the first uplink control channel and the type of the second uplink control channel are the two-symbol short physical uplink control channel. In another example, assuming that the terminal device determines that one of the first scheduling request and the second scheduling request uses the OCC, the terminal device cannot determine the priority of the first scheduling request and the priority of the second scheduling request when determining that the type of the first uplink control channel is the long physical uplink control channel and the type of the second uplink control channel is the long physical uplink control channel. There are a plurality of cases in which the terminal device determines that one of the first scheduling request and the second scheduling request uses the OCC, but cannot determine the priority of the first scheduling request and the priority of the second scheduling request according to the type of the first uplink control channel and the type of the second uplink control channel and a collision position. Details are not described exhaustively herein for the sake of brevity. For ease of description, a case in which one of the first scheduling request and the second scheduling request uses the OCC, but the terminal device cannot determine the priority of the first scheduling request and the priority of the second scheduling request according to the type of the first uplink control channel and the type of the second uplink control channel and the collision position is hereinafter referred to as a case in which the terminal device cannot determine the priority of the first scheduling request and the priority of the second scheduling request according to whether the OCC is used.

Optionally, in some embodiments, the first priority information of the scheduling requests may also be any one or all of the symbol duration information of the scheduling requests, the transmission durations of the scheduling requests, the quantities of unsuccessful transmissions of the scheduling requests, and whether the scheduling requests use the orthogonal cover codes.

Optionally, in some embodiments, the first priority information of the first scheduling request is the symbol duration information of the scheduling request, the transmission duration of the scheduling request, and the quantity of unsuccessful transmissions of the scheduling request. In this case, the terminal device may determine the priority of the first scheduling request and the priority of the second scheduling request according to the symbol duration information of the scheduling requests, the transmission durations of the scheduling requests, and the quantities of unsuccessful transmissions of the scheduling requests sequentially. For ease of description, the manner in which the terminal device determines the priority of the first scheduling request and the priority of the second scheduling request according to the symbol duration information of the scheduling requests, the transmission durations of the scheduling requests, and the quantities of unsuccessful transmissions of the scheduling requests sequentially is hereinafter referred to as "the terminal device determines the priority of the first scheduling request and the priority of the second scheduling request according to a first arrangement sequence".

For example, that the terminal device determines the priority of the first scheduling request and the priority of the second scheduling request according to a first arrangement sequence includes: if the terminal device can determine the priority of the first scheduling request and the priority of the second scheduling request according to the symbol duration information of the scheduling requests, the terminal device determines the priority of the first scheduling request and the priority of the second scheduling request according to the symbol duration information of the scheduling requests; if the terminal device cannot determine the priority of the first scheduling request and the priority of the second scheduling request according to the symbol duration information of the scheduling requests, the terminal device determines the priority of the first scheduling request and the priority of the second scheduling request according to the transmission durations of the scheduling requests; and if the terminal device cannot determine the priority of the first scheduling request according to the symbol duration information of the scheduling requests or the transmission durations of the scheduling requests, the terminal device determines the priority of the first scheduling request and the priority of the second scheduling request according to the quantities of unsuccessful transmissions of the scheduling requests.

Further, when determining that the duration of each symbol used to carry the first scheduling request is shorter than the duration of each symbol used to carry the second scheduling request, the terminal device may determine that the priority of the first scheduling request is higher than the priority of the second scheduling request. When determining that the duration of each symbol used to carry the first scheduling request is longer than the duration of each symbol used to carry the second scheduling request, the terminal device may determine that the priority of the first scheduling request is lower than the priority of the second scheduling request. When determining that the duration of each symbol used to carry the first scheduling request is equal to the duration of each symbol used to carry the second scheduling request, and the transmission duration of the first scheduling request is shorter than the transmission duration of the second scheduling request, the terminal device may determine that the priority of the first scheduling request is higher than the priority of the second scheduling request. When determining that the duration of each symbol used to carry the first scheduling request is equal to the duration of each symbol used to carry the second scheduling request, and the transmission duration of the first scheduling request is longer than the transmission duration of the second scheduling request, the terminal device may determine that the priority of the first scheduling request is lower than the priority of the second scheduling request. When determining that the duration of each symbol used to carry the first scheduling request is equal to the duration of each symbol used to carry the second scheduling request, and the transmission duration of the first scheduling request is equal to the transmission duration of the second scheduling request, and the quantity of unsuccessful transmissions of the first scheduling request is greater than the quantity of unsuccessful transmissions of the second scheduling request, the terminal device determines that the priority of the first scheduling request is higher than the priority of the second scheduling request. When determining that the duration of each symbol used to carry the first scheduling request is equal to the duration of each symbol used to carry the second scheduling request, and the transmission duration of the first scheduling request is equal to the transmission duration of the second scheduling request, and the quantity of unsuccessful transmissions of the first scheduling request is less than the quantity of unsuccessful transmissions of the second scheduling request, the terminal device determines that the priority of the first scheduling request is lower than the priority of the second scheduling request.

Optionally, in other embodiments, when the first priority information of the first scheduling request is the symbol duration information of the scheduling request, the transmission duration of the scheduling request, and the quantity of unsuccessful transmissions of the scheduling request, the terminal device may determine the priority of the first scheduling request and the priority of the second scheduling request according to the transmission durations of the scheduling requests, the symbol duration information of the scheduling requests, and the quantity of unsuccessful transmissions of the scheduling requests sequentially. An exemplary implementation in which the terminal device determines the priority of the first scheduling request and the priority of the second scheduling request according to the transmission durations of the scheduling requests, the symbol duration information of the scheduling requests, and the quantities of unsuccessful transmissions of the scheduling requests sequentially is similar to the implementation in which the terminal device determines the priority of the first scheduling request and the priority of the second scheduling request according to the symbol duration information of the scheduling requests, the transmission durations of the scheduling requests, and the quantities of unsuccessful transmissions of the scheduling requests sequentially. Details are not described herein for the sake of brevity. For ease of description, the manner in which the terminal device determines the priority of the first scheduling request and the priority of the second scheduling request according to the transmission durations of the scheduling requests, the symbol duration information of the scheduling requests, and the quantities of unsuccessful transmissions of the scheduling requests sequentially is hereinafter referred to as "the terminal device determines the priority of the first scheduling request and the priority of the second scheduling request according to a second arrangement sequence".

Optionally, in other embodiments, when the first priority information of the first scheduling request is the symbol duration information of the scheduling request, the transmission duration of the scheduling request, and the quantity of unsuccessful transmissions of the scheduling request, the terminal device may determine the priority of the first scheduling request and the priority of the second scheduling request according to the quantities of unsuccessful transmissions of the scheduling requests, the transmission durations of the scheduling requests, and the symbol duration information of the scheduling requests sequentially. An exemplary implementation in which the terminal device determines the priority of the first scheduling request and the priority of the second scheduling request according to the quantities of unsuccessful transmissions of the scheduling requests, the transmission durations of the scheduling requests, and the symbol duration information of the scheduling requests sequentially is similar to the implementation in which the terminal device determines the priority of the first scheduling request and the priority of the second scheduling request according to the symbol duration information of the scheduling requests, the transmission durations of the scheduling requests, and the quantities of unsuccessful transmission of the scheduling requests sequentially. Details are not described herein for the sake of brevity. For ease of description, the manner in which the terminal device determines the priority of the first scheduling request and the priority of the second scheduling request according to the quantities of unsuccessful transmissions of the scheduling requests, the transmission durations of the scheduling requests, and the symbol duration information of the scheduling requests sequentially is hereinafter referred to as "the terminal device determines the priority of the first scheduling request and the priority of the second scheduling request according to a third arrangement sequence".

It may be understood that when the first priority information of the first scheduling request is the symbol duration information of the scheduling request, the transmission duration of the scheduling request, and the quantity of unsuccessful transmissions of the scheduling request, in addition to the arrangement sequences of the symbol duration information of the scheduling requests, the transmission durations of the scheduling requests, and the quantities of unsuccessful transmissions of the scheduling requests illustrated in the foregoing embodiments, there are other arrangement sequences for the symbol duration information of the scheduling requests, the transmission durations of the scheduling requests, and the quantities of unsuccessful transmissions of the scheduling requests. The arrangement sequences are not exhaustively illustrated herein. The terminal device may also determine the priority of the first scheduling request and the priority of the second scheduling request according to the other arrangement sequences.

It may be understood that when determining the priority of the first scheduling request and the priority of the second scheduling request, the terminal device determines the priority of the first scheduling request and the priority of the second scheduling request according to only one of a plurality of arrangement sequences.

Optionally, in some embodiments, the first priority information of the scheduling requests may be whether the scheduling requests use the OCCs, and the symbol duration information of the scheduling requests. In this case, when the terminal device determines that at least one of the first scheduling request and the second scheduling request uses the OCC, and the terminal device can determine the priority of the first scheduling request and the priority of the second scheduling request according to whether the OCC is used, the terminal device determines the priority of the first scheduling request and the priority of the second scheduling request according to whether the OCC is used; when the terminal device determines that at least one of the first scheduling request and the second scheduling request uses the OCC, but the terminal device cannot determine the priority of the first scheduling request and the priority of the second scheduling request according to whether the OCC is used, the terminal device determines the priority of the first scheduling request and the priority of the second scheduling request according to the symbol duration information of the first scheduling request and the symbol duration information of the second scheduling request; or when determining that neither the first scheduling request nor the second scheduling request uses the OCC, the terminal device determines the priority of the first scheduling request and the priority of the second scheduling request according to the symbol duration information of the first scheduling request and the symbol duration information of the second scheduling request.

Some cases are not included in an exemplary implementation of determining the priority of the first scheduling request and the priority of the second scheduling request when the scheduling requests include only whether the scheduling requests use the OCCs. For example, assuming that the terminal device determines that one of the first scheduling request and the second scheduling request uses the OCC, the terminal device cannot determine the priority of the first scheduling request and the priority of the second scheduling request when determining that both the type of the first uplink control channel and the type of the second uplink control channel are the two-symbol short physical uplink control channel. In another example, assuming that the terminal device determines that one of the first scheduling request and the second scheduling request uses the OCC, the terminal device cannot determine that the priority of the first scheduling request is lower than the priority of the second scheduling request when determining that the type of the first uplink control channel is the long physical uplink control channel and the type of the second uplink control channel is the long physical uplink control channel. There are a plurality of cases in which the terminal device determines that one of the first scheduling request and the second scheduling request uses the OCC, but cannot determine the priority of the first scheduling request and the priority of the second scheduling request according to the type of the first uplink control channel and the type of the second uplink control channel and the collision position. Details are not described exhaustively herein for the sake of brevity. Therefore, when the priorities of the scheduling requests may be whether the scheduling requests use the OCCs, and the symbol duration information of the scheduling requests, when determining that the type of the first uplink control channel is the two-symbol short physical uplink control channel and the type of the second uplink control channel is the one-symbol short physical uplink control channel, and the time domain location of the first symbol on the first uplink control channel is the same as a time domain location of a symbol on the second uplink control channel, the terminal device may determine, according to the symbol duration information of the scheduling requests, that the priority of the first scheduling request is higher than the priority of the second scheduling request. When determining that the type of the first uplink control channel is the two-symbol short physical uplink control channel and the type of the second uplink control channel is the one-symbol short physical uplink control channel, and the time domain location of the first symbol on the first uplink control channel is the same as a time domain location of a symbol on the second uplink control channel, and the duration of each symbol carrying the first scheduling request is shorter than the duration of each symbol carrying the second scheduling request, the terminal device determines that the priority of the first scheduling request is higher than the priority of the second scheduling request. When determining that the type of the first uplink control channel is the two-symbol short physical uplink control channel and the type of the second uplink control channel is the one-symbol short physical uplink control channel, and the time domain location of the first symbol on the first uplink control channel is the same as a time domain location of a symbol on the second uplink control channel, and the duration of each symbol carrying the first scheduling request is longer than the duration of each symbol carrying the second scheduling request, the terminal device determines that the priority of the first scheduling request is lower than the priority of the second scheduling request.

Optionally, in other embodiments, the first priorities of the scheduling requests may include whether the scheduling requests use the OCCs, and include one or more or all of the symbol duration information of the scheduling requests, the transmission durations of the scheduling requests, and the quantities of unsuccessful transmissions of the scheduling requests. Similar to whether the first priorities of the scheduling requests are the OCCs and the symbol duration information of the scheduling requests. When the terminal device determines that at least one of the first scheduling request and the second scheduling request uses the OCC, and can determine the priority of the first scheduling request and the priority of the second scheduling request according to the type of the first uplink control channel and the type of the second uplink control channel and the collision position, the terminal device determines the priority of the first scheduling request and the priority of the second scheduling request according to the type of the first uplink control channel and the type of the second uplink control channel and the collision position. When the terminal device determines that neither the first scheduling request nor the second scheduling request can use the OCC or cannot determine the priority of the first scheduling request and the priority of the second scheduling request according to the type of the first uplink control channel and the type of the second uplink control channel and the collision position, the terminal device determines the priority of the first scheduling request and the priority of the second scheduling request according to other information in the first priority information of the scheduling requests than whether the scheduling requests use the OCCs. It may be understood that, when the first priority information of the scheduling requests includes at least two pieces of information such as, any two or all of the symbol duration information of the scheduling requests, the transmission durations of the scheduling requests, and the quantities of unsuccessful transmissions of the scheduling requests) in addition to whether the scheduling requests use the OCCs, the at least two pieces of information may also have different arrangement sequences. An exemplary arrangement sequence may be one of the first arrangement sequence, the second arrangement sequence, and the third arrangement sequence described in the foregoing embodiments, or an arrangement sequence that is not specifically illustrated.

Optionally, in some embodiments, when the first priority information of the first scheduling request includes the quantity of unsuccessful transmissions of the scheduling request and includes at least one of the symbol duration information of the scheduling request, the transmission duration of the scheduling request, and whether the scheduling request uses the OCC, the terminal device may first determine whether both the quantity of unsuccessful transmissions of the first scheduling request and the quantity of unsuccessful transmissions of the second scheduling request are equal to a preset quantity of times; and directly determine the priority of the first scheduling request and the priority of the second scheduling request according to the determination, or determine the priority of the first scheduling request and the priority of the second scheduling request according to a preset arrangement sequence.

For example, when the first priority information of the first scheduling request is the quantity of unsuccessful transmissions of the scheduling request, the symbol duration information of the scheduling request, and the transmission duration of the scheduling request, when determining that the quantity of unsuccessful transmissions of the first scheduling request is equal to the preset quantity of times, and the quantity of unsuccessful transmissions of the second scheduling request is less than the preset quantity of times, the terminal device determines that the priority of the first scheduling request is higher than the priority of the second scheduling request. When determining that the quantity of unsuccessful transmissions of the first scheduling request is less than the preset quantity of times, and the quantity of unsuccessful transmissions of the second scheduling request is equal to the preset quantity of times, the terminal device determines that the priority of the first scheduling request is lower than the priority of the second scheduling request. When determining that both the quantity of unsuccessful transmissions of the first scheduling request and the quantity of unsuccessful transmissions of the second scheduling request are equal to or less than the preset quantity of times, the terminal device determines the priority of the first scheduling request and the priority of the second scheduling request according to a preset arrangement sequence. The preset arrangement sequence may be any one of the first arrangement sequence, the second arrangement sequence, and the third arrangement sequence, or may be an arrangement sequence that is not specifically illustrated.

In another example, when the first priority information of the first scheduling request is the quantity of unsuccessful transmissions of the scheduling request and the symbol duration information of the scheduling request, when determining that the quantity of unsuccessful transmissions of the first scheduling request is equal to the preset quantity of times, and the quantity of unsuccessful transmissions of the second scheduling request is less than the preset quantity of times, the terminal device determines that the priority of the first scheduling request is higher than the priority of the second scheduling request. When determining that the quantity of unsuccessful transmissions of the first scheduling request is less than the preset quantity of times, and the quantity of unsuccessful transmissions of the second scheduling request is equal to the preset quantity of times, the terminal device determines that the priority of the first scheduling request is lower than the priority of the second scheduling request. When determining that both the quantity of unsuccessful transmissions of the first scheduling request and the quantity of unsuccessful transmissions of the second scheduling request are equal to or less than the preset quantity of times, and the duration of each symbol used to carry the first scheduling request is shorter than the duration of each symbol used to carry the second scheduling request, the terminal device determines that the priority of the first scheduling request is higher than the priority of the second scheduling request. When determining that both the quantity of unsuccessful transmissions of the first scheduling request and the quantity of unsuccessful transmissions of the second scheduling request are equal to or less than the preset quantity of times, and the duration of each symbol used to carry the first scheduling request is longer than the duration of each symbol used to carry the second scheduling request, the terminal device determines that the priority of the first scheduling request is lower than the priority of the second scheduling request. When determining that both the quantity of unsuccessful transmissions of the first scheduling request and the quantity of unsuccessful transmissions of the second scheduling request are less than the preset quantity of times, and the duration of each symbol used to carry the first scheduling request is equal to the duration of each symbol used to carry the second scheduling request, and the quantity of unsuccessful transmissions of the first scheduling request is greater than the quantity of unsuccessful transmissions of the second scheduling request, the terminal device determines that the priority of the first scheduling request is higher than the priority of the second scheduling request. When determining that both the quantity of unsuccessful transmissions of the first scheduling request and the quantity of unsuccessful transmissions of the second scheduling request are equal to or less than the preset quantity of times, and the duration of each symbol used to carry the first scheduling request is equal to the duration of each symbol used to carry the second scheduling request, and the quantity of unsuccessful transmissions of the first scheduling request is greater than the quantity of unsuccessful transmissions of the second scheduling request, the terminal device determines that the priority of the first scheduling request is lower than the priority of the second scheduling request.

In another example, when the first priority information of the first scheduling request is the transmission duration of the scheduling request and the quantity of unsuccessful transmissions of the scheduling request, when determining that the quantity of unsuccessful transmissions of the first scheduling request is equal to the preset quantity of times, and the quantity of unsuccessful transmissions of the second scheduling request is less than the preset quantity of times, the terminal device determines that the priority of the first scheduling request is higher than the priority of the second scheduling request. When determining that the quantity of unsuccessful transmissions of the first scheduling request is less than the preset quantity of times, and the quantity of unsuccessful transmissions of the second scheduling request is equal to the preset quantity of times, the terminal device determines that the priority of the first scheduling request is lower than the priority of the second scheduling request. When determining that both the quantity of unsuccessful transmissions of the first scheduling request and the quantity of unsuccessful transmissions of the second scheduling request are equal to or less than the preset quantity of times, and the transmission duration of the first scheduling request is shorter than the transmission duration of the second scheduling request, the terminal device determines that the priority of the first scheduling request is higher than the priority of the second scheduling request. When determining that both the quantity of unsuccessful transmissions of the first scheduling request and the quantity of unsuccessful transmissions of the second scheduling request are equal to or less than the preset quantity of times, and the transmission duration of the first scheduling request is longer than the transmission duration of the second scheduling request, the terminal device determines that the priority of the first scheduling request is lower than the priority of the second scheduling request. When determining that both the quantity of unsuccessful transmissions of the first scheduling request and the quantity of unsuccessful transmissions of the second scheduling request are less than the preset quantity of times, and the transmission duration of the first scheduling request is equal to the transmission duration of the second scheduling request, and the quantity of unsuccessful transmissions of the first scheduling request is greater than the quantity of unsuccessful transmissions of the second scheduling request, the terminal device determines that the priority of the first scheduling request is higher than the priority of the second scheduling request. When determining that both the quantity of unsuccessful transmissions of the first scheduling request and the quantity of unsuccessful transmissions of the second scheduling request are equal to or less than the preset quantity of times, and the transmission duration of the first scheduling request is equal to the transmission duration of the second scheduling request, and the quantity of unsuccessful transmissions of the first scheduling request is greater than the quantity of unsuccessful transmissions of the second scheduling request, the terminal device determines that the priority of the first scheduling request is lower than the priority of the second scheduling request.

The preset quantity of times may be equal to N–M, where N is a positive integer greater than 0, M is a positive integer greater than or equal to 0 and less than N, and N indicates the maximum quantity of unsuccessful transmissions of the scheduling request. Optionally, in some embodiments, a value of M may be equal to 0. Optionally, in other embodiments, a value of M may be equal to 1. Optionally, in other embodiments, a value of M may be equal to 2.

Certainly, the first priority information of the scheduling requests may also be the quantities of unsuccessful transmissions of the scheduling requests and whether the scheduling requests use the OCCs; or the first priority information of the scheduling requests may be the quantities of unsuccessful transmissions of the scheduling requests, whether the scheduling requests use the OCCs, the transmission durations of the scheduling requests, and the like. In the cases, an exemplary implementation of determining the priority of the first scheduling request and the priority of the second scheduling request is similar to the exemplary implementation described in the foregoing embodiment. Details are not described herein for the sake of brevity.

Optionally, in some embodiments, the method shown in FIG. 3 may further include: the terminal device determines second priority information of the first scheduling request and second priority information of the second scheduling request. Optionally, in some embodiments, the second priority information of the scheduling requests may be periods of the scheduling requests. Optionally, in other embodiments, the second priority information of the scheduling requests may be service types of the scheduling requests. Optionally, in other embodiments, the second priority information of the scheduling requests may be service types of the scheduling requests and periods of the scheduling requests.

That the terminal device determines a priority of the first scheduling request and a priority of the second scheduling request according to first priority information of the first scheduling request and first priority information of the second scheduling request includes: the terminal device determines the priority of the first scheduling request and the priority of the second scheduling request according to the first priority information of the first scheduling request, the first priority information of the second scheduling request, the second priority information of the first scheduling request, and the second priority information of the second scheduling request.

Optionally, in some embodiments, the first priority information of the scheduling requests is the symbol duration information of the scheduling requests. In this case, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request includes: if the terminal device can determine the priority of the first scheduling request and the priority of the second scheduling request according to the symbol duration information of the scheduling requests, the terminal device determines the priority of the first scheduling request and the priority of the second scheduling request according to the symbol duration information of the scheduling request; or if the terminal device cannot determine the priority of the first scheduling request and the priority of the second scheduling request according to the symbol duration information of the scheduling requests, the terminal device determines the priority of the first scheduling request and the priority of the second scheduling request according to the second priority information of the scheduling requests.

For example, it is assumed that the second priority information of the scheduling requests is the periods of the scheduling requests. When determining that the duration of each symbol used to carry the first scheduling request is shorter than the duration of each symbol used to carry the second scheduling request, the terminal device determines that the priority of the first scheduling request is higher than the priority of the second scheduling request. When determining that the duration of each symbol used to carry the first scheduling request is longer than the duration of each symbol used to carry the second scheduling request, the terminal device determines that the priority of the first scheduling request is lower than the priority of the second scheduling request. When determining that the duration of each symbol used to carry the first scheduling request is equal to the duration of each symbol used to carry the second scheduling request, and a period of the first scheduling request is shorter than a period of the second scheduling request, the terminal device determines that the priority of the first scheduling request is higher than the priority of the second scheduling request. When determining that the duration of each symbol used to carry the first scheduling request is equal to the duration of each symbol used to carry the second scheduling request, and a period of the first scheduling request is longer than a period of the second scheduling request, the terminal device determines that the priority of the first scheduling request is lower than the priority of the second scheduling request.

Optionally, in some embodiments, the first priority information of the scheduling requests is the transmission durations of the scheduling requests. In this case, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: if the terminal device can determine the priority of the first scheduling request and the priority of the second scheduling request according to the transmission durations of the scheduling requests, the terminal device determines the priority of the first scheduling request and the priority of the second scheduling request according to the transmission durations of the scheduling requests; or if the terminal device cannot determine the priority of the first scheduling request and the priority of the second scheduling request according to the transmission durations of the scheduling requests, the terminal device determines the priority of the first scheduling request and the priority of the second scheduling request according to the second priority information of the scheduling requests.

For example, it is assumed that the second priority information of the scheduling requests is the periods of the scheduling requests. When determining that the transmission duration of the first scheduling request is shorter than the transmission duration of the second scheduling request, the terminal device determines that the priority of the first scheduling request is higher than the priority of the second scheduling request. When determining that the transmission duration of the first scheduling request is longer than the transmission duration of the second scheduling request, the terminal device determines that the priority of the first scheduling request is lower than the priority of the second scheduling request. When determining that the transmission duration of the first scheduling request is equal to the transmission duration of the second scheduling request, and the period of the first scheduling request is shorter than the period of the second scheduling request, the terminal device determines that the priority of the first scheduling request is higher than the priority of the second scheduling request. When determining that the transmission duration of the first scheduling request is equal to the transmission duration of the second scheduling request, and the period of the first scheduling request is longer than the period of the second scheduling request, the terminal device determines that the priority of the first scheduling request is lower than the priority of the second scheduling request.

Optionally, in some embodiments, the first priority information of the scheduling requests is the quantities of unsuccessful transmissions of the scheduling requests. In this case, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: if the terminal device can determine the priority of the first scheduling request and the priority of the second scheduling request according to the quantities of unsuccessful transmissions of the scheduling requests, the terminal device determines the priority of the first scheduling request and the priority of the second scheduling request according to the quantities of unsuccessful transmissions of the scheduling requests; or if the terminal device cannot determine the priority of the first scheduling request and the priority of the second scheduling request according to the quantities of unsuccessful transmissions of the scheduling requests, the terminal device determines the priority of the first scheduling request and the priority of the second scheduling request according to the second priority information of the scheduling requests.

For example, it is assumed that the second priority information of the scheduling requests is the periods of the scheduling requests. When determining that the quantity of unsuccessful transmissions of the first scheduling request is greater than the quantity of unsuccessful transmissions of the second scheduling request, the terminal device determines that the priority of the first scheduling request is higher than the priority of the second scheduling request. When determining that the quantity of unsuccessful transmissions of the first scheduling request is less than the quantity of unsuccessful transmissions of the second scheduling request, the terminal device determines that the priority of the first scheduling request is lower than the priority of the second scheduling request. When determining that the quantity of unsuccessful transmissions of the first scheduling request is equal to the quantity of unsuccessful transmissions of the second scheduling request, and the period of the first scheduling request is shorter than the period of the second scheduling request, the terminal device determines that the priority of the first scheduling request is higher than the priority of the second scheduling request. When determining that the quantity of unsuccessful transmissions of the first scheduling request is equal to the quantity of unsuccessful transmissions of the second scheduling request, and the period of the first scheduling request is longer than the period of the second scheduling request, the terminal device determines that the priority of the first scheduling request is lower than the priority of the second scheduling request.

Optionally, in some embodiments, the first priority information of the scheduling requests is whether the scheduling requests use the OCCs. The second priority information of the scheduling requests is the periods of the scheduling requests. In this case, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: if the terminal device can determine the priority of the first scheduling request and the priority of the second scheduling request according to whether the OCCs are used, the terminal device determines the priority of the first scheduling request and the priority of the second scheduling request according to whether the OCCs are used; or if the terminal device cannot determine the priority of the first scheduling request and the priority of the second scheduling request according to whether the OCCs are used, the terminal device determines the priority of the first scheduling request and the priority of the second scheduling request according to the periods of the scheduling requests.

For example, when the terminal device cannot determine the priority of the first scheduling request and the priority of the second scheduling request according to whether the OCCs are used, and the period of the first scheduling request is shorter than the period of the second scheduling request, the terminal device determines that the priority of the first scheduling request is higher than the priority of the second scheduling request; or when the terminal device cannot determine the priority of the first scheduling request and the priority of the second scheduling request according to whether the OCCs are used, and the period of the first scheduling request is longer than the period of the second scheduling request, the terminal device determines that the priority of the first scheduling request is higher than the priority of the second scheduling request.

In the foregoing embodiment, when the first priority information of the scheduling requests is one of the symbol duration information of the scheduling requests, the transmission durations of the scheduling requests, and the quantities of unsuccessful transmissions of the scheduling requests, the terminal device may determine the first priority information of the first scheduling request and the priority information of the second scheduling request according to the second priority information of the first scheduling request and the second priority information of the second scheduling request only when the terminal device cannot determine the priority of the first scheduling request and the priority information of the second scheduling request according to the first priority information of the first scheduling request and the first priority information of the second scheduling request.

In other embodiments, when the first priority information of the scheduling requests is one of the symbol duration information of the scheduling requests, the transmission durations of the scheduling requests, and the quantities of unsuccessful transmissions of the scheduling requests, the terminal device may determine the first priority information of the first scheduling request and the priority information of the second scheduling request according to the first priority information of the first scheduling request and the first priority information of the second scheduling request only when the terminal device cannot determine the priority of the first scheduling request and the priority information of the second scheduling request according to the second priority information of the first scheduling request and the second priority information of the second scheduling request.

For example, it is assumed that the second priority information of the scheduling requests is the periods of the scheduling requests. When determining that the period of the first scheduling request is shorter than the period of the second scheduling request, the terminal device determines that the priority of the first scheduling request is higher than the priority of the second scheduling request. When determining that the period of the first scheduling request is longer than the period of the second scheduling request, the terminal device determines that the priority of the first scheduling request is lower than the priority of the second scheduling request. When determining that the period of the first scheduling request is equal to the period of the second scheduling request, and the transmission duration of the first scheduling request is shorter than the transmission duration of the second scheduling request, the terminal device determines that the priority of the first scheduling request is higher than the priority of the second scheduling request. When determining that the period of the first scheduling request is equal to the period of the second scheduling request, and the transmission duration of the first scheduling request is longer than the transmission duration of the second scheduling request, the terminal device determines that the priority of the first scheduling request is lower than the priority of the second scheduling request.

In another example, it is assumed that the second priority information of the scheduling requests is the periods of the scheduling requests. When determining that the period of the first scheduling request is shorter than the period of the second scheduling request, the terminal device determines that the priority of the first scheduling request is higher than the priority of the second scheduling request. When determining that the period of the first scheduling request is longer than the period of the second scheduling request, the terminal device determines that the priority of the first scheduling request is lower than the priority of the second scheduling request. When determining that the period of the first scheduling request is equal to the period of the second scheduling request, and the quantity of unsuccessful transmissions of the first scheduling request is greater than the quantity of unsuccessful transmissions of the second scheduling request, the terminal device determines that the priority of the first scheduling request is higher than the priority of the second scheduling request. When determining that the period of the first scheduling request is equal to the period of the second scheduling request, and the quantity of unsuccessful transmissions of the first scheduling request is less than the quantity of unsuccessful transmissions of the second scheduling request, the terminal device determines that the priority of the first scheduling request is lower than the priority of the second scheduling request.

Optionally, in some embodiments, the first priority information of the scheduling requests may also be any one or all of the symbol duration information of the scheduling requests, the transmission durations of the scheduling requests, the quantities of unsuccessful transmissions of the scheduling requests, and whether the scheduling requests use the orthogonal cover codes.

Optionally, in some embodiments, the terminal device may determine the first priority information of the first scheduling request and the priority information of the second scheduling request according to the second priority information of the first scheduling request and the second priority information of the second scheduling request only when the terminal device cannot determine the priority of the first scheduling request and the priority of the second scheduling request according to the first priority information of the first scheduling request and the first priority information of the second scheduling request.

For example, when the first priority information of the scheduling requests is the symbol duration information of the scheduling requests and the transmission durations of the scheduling requests, and the second priority information of the scheduling requests is the periods of the scheduling requests, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: when determining that the duration of each symbol used to carry the first scheduling request is shorter than the duration of each symbol used to carry the second scheduling request, the terminal device may determine that the priority of the first scheduling request is higher than the priority of the second scheduling request; when determining that the duration of each symbol used to carry the first scheduling request is longer than the duration of each symbol used to carry the second scheduling request, the terminal device may determine that the priority of the first scheduling request is lower than the priority of the second scheduling request; when determining that the duration of each symbol used to carry the first scheduling request is equal to the duration of each symbol used to carry the second scheduling request, and the transmission duration of the first scheduling request is shorter than the transmission duration of the second scheduling request, the terminal device may determine that the priority of the first scheduling request is higher than the priority of the second scheduling request; when determining that the duration of each symbol used to carry the first scheduling request is equal to the duration of each symbol used to carry the second scheduling request, and the transmission duration of the first scheduling request is longer than the transmission duration of the second scheduling request, the terminal device may determine that the priority of the first scheduling request is lower than the priority of the second scheduling request; when determining that the duration of each symbol used to carry the first scheduling request is equal to the duration of each symbol used to carry the second scheduling request, and the transmission duration of the first scheduling request is equal to the transmission duration of the second scheduling request, and the period of the first scheduling request is shorter than the period of the second scheduling request, the terminal device determines that the priority of the first scheduling request is higher than the priority of the second scheduling request; or when determining that the duration of each symbol used to carry the first scheduling request is equal to the duration of each symbol used to carry the second scheduling request, and the transmission duration of the first scheduling request is equal to the transmission duration of the second scheduling request, and the period of the first scheduling request is longer than the period of the second scheduling request, the terminal device determines that the priority of the first scheduling request is lower than the priority of the second scheduling request.

Optionally, in other embodiments, the terminal device may determine the first priority information of the first scheduling request and the priority information of the second scheduling request according to the first priority information of the first scheduling request and the first priority information of the second scheduling request when the terminal device cannot determine the priority of the first scheduling request and the priority of the second scheduling request according to the second priority information of the first scheduling request and the second priority information of the second scheduling request.

For example, when the first priority information of the scheduling requests is the symbol duration information of the scheduling requests and the transmission durations of the scheduling requests, and the second priority information of the scheduling requests is the periods of the scheduling requests, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: when determining that the period of the first scheduling request is shorter than the period of the second scheduling request, the terminal device may determine that the priority of the first scheduling request is higher than the priority of the second scheduling request; when determining that the period of the first scheduling request is longer than the period of the second scheduling request, the terminal device may determine that the priority of the first scheduling request is lower than the priority of the second scheduling request; when determining that the period of the first scheduling request is equal to the period of the second scheduling request, and the duration of each symbol used to carry the first scheduling request is shorter than the duration of each symbol used to carry the second scheduling request, the terminal device determines that the priority of the first scheduling request is higher than the priority of the second scheduling request; when determining that the period of the first scheduling request is equal to the period of the second scheduling request, and the duration of each symbol used to carry the first scheduling request is longer than the duration of each symbol used to carry the second scheduling request, the terminal device determines that the priority of the first scheduling request is lower than the priority of the second scheduling request; when determining that the period of the first scheduling request is equal to the period of the second scheduling request, and the duration of each symbol used to carry the first scheduling request is equal to the duration of each symbol used to carry the second scheduling request, and the transmission duration of the first scheduling request is shorter than the transmission duration of the second scheduling request, the terminal device may determine that the priority of the first scheduling request is higher than the priority of the second scheduling request; or when determining that the period of the first scheduling request is equal to the period of the second scheduling request, and the duration of each symbol used to carry the first scheduling request is equal to the duration of each symbol used to carry the second scheduling request, and the transmission duration of the first scheduling request is longer than the transmission duration of the second scheduling request, the terminal device may determine that the priority of the first scheduling request is lower than the priority of the second scheduling request.

Optionally, in other embodiments, the terminal device may determine the priority of the first scheduling request and the priority of the second scheduling request according to the second priority information of the first scheduling request and the second priority information of the second scheduling request when the terminal device cannot determine the priority of the first scheduling request and the priority of the second scheduling request according to one part of information in the first priority information of the first scheduling request and the first priority information of the second scheduling request; and determine the first priority information of the first scheduling request and the first priority information of the second scheduling request according to another part of information in the first priority information of the first scheduling request and the first priority information of the second scheduling request when the terminal device cannot determine the priority of the first scheduling request and the priority information of the second scheduling request according to the one part of information in the first priority information of the first scheduling request and the first priority information of the second scheduling request and the second priority information of the first scheduling request and the second priority information of the second scheduling request.

For example, when the first priority information of the scheduling requests is whether the scheduling requests use the OCCs, the symbol duration information of the scheduling requests, the transmission durations of the scheduling requests, and the quantities of unsuccessful transmissions of the scheduling requests, and the second priority information of the scheduling requests is the periods of the scheduling requests, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request includes: the terminal device determines the priority of the first scheduling request and the priority of the second scheduling request according to whether the OCCs are used; when the terminal device cannot determine the priority of the first scheduling request and the priority of the second scheduling request according to whether the OCCs are used, the terminal device determines the priority of the first scheduling request and the priority of the second scheduling request according to the symbol duration information of the scheduling requests; when the terminal device cannot determine the priority of the first scheduling request and the priority of the second scheduling request according to whether the OCCs are used and cannot determine the priority of the first scheduling request and the priority of the second scheduling request according to the symbol duration information of the scheduling requests, the terminal device determines the priority of the first scheduling request and the priority of the second scheduling request according to the periods of the scheduling requests; when the terminal device cannot determine the priority of the first scheduling request and the priority of the second scheduling request according to whether the OCCs are used, or according to the symbol duration information of the scheduling requests, or according to the periods of the scheduling requests, the terminal device determines the priority of the first scheduling request and the priority of the second scheduling request according to the transmission durations of the scheduling requests; or when the terminal device cannot determine the priority of the first scheduling request and the priority of the second scheduling request according to whether the OCCs are used, and cannot determine the priority of the first scheduling request and the priority of the second scheduling request according to the symbol duration information of the scheduling requests, or according to the periods of the scheduling requests, or according to the transmission durations of the scheduling requests, the terminal device determines the priority of the first scheduling request and the priority of the second scheduling request according to the quantities of unsuccessful transmissions of the scheduling requests. An arrangement sequence of the symbol duration information of the scheduling requests, the transmission durations of the scheduling requests, the quantities of unsuccessful transmissions of the scheduling requests, whether the scheduling requests use the OCCs, and the periods of the scheduling requests used by the terminal device is: whether the scheduling requests use the OCCs, the symbol duration information of the scheduling requests, the periods of the scheduling requests, the transmission durations of the scheduling requests, and the quantities of unsuccessful transmissions of the scheduling requests. For ease of description, the arrangement sequence is hereinafter referred to as a fourth arrangement sequence.

It may be understood that when determining that the duration of the symbol used to carry the first scheduling request is equal to the duration of the symbol used to carry the second scheduling request, the terminal device cannot determine the priority of the first scheduling request and the priority of the second scheduling request according to the symbol duration information of the scheduling requests. When determining that the period of the first scheduling request is equal to the period of the second scheduling request, the terminal device cannot determine the priority of the first scheduling request and the priority of the second scheduling request according to the periods of the scheduling requests. When determining that the transmission duration of the first scheduling request is equal to the transmission duration of the second scheduling request, the terminal device cannot determine the priority of the first scheduling request and the priority of the second scheduling request according to the transmission durations of the scheduling requests.

The determining the priority of the first scheduling request and the priority of the second scheduling request according to the symbol duration information of the scheduling requests includes: when determining that the duration of each symbol used to carry the first scheduling request is shorter than the duration of each symbol used to carry the second scheduling request, determining that the priority of the first scheduling request is higher than the priority of the second scheduling request; or when the terminal device determines that the duration of each symbol used to carry the first scheduling request is longer than the duration of each symbol used to carry the second scheduling request, determining that the priority of the first scheduling request is lower than the priority of the second scheduling request. Alternatively, the determining the priority of the first scheduling request and the priority of the second scheduling request according to the symbol duration information of the scheduling requests includes: when determining that the spacing between subcarriers used to carry the first scheduling request is greater than the spacing between subcarriers used to carry the second scheduling request, determining that the priority of the first scheduling request is higher than the priority of the second scheduling request; or when determining that the spacing between carriers used to carry the first scheduling request is less than the spacing between subcarriers used to carry the second scheduling request, determining that the priority of the second scheduling request is higher than the priority of the first scheduling request.

The determining the priority of the first scheduling request and the priority of the second scheduling request according to the periods of the scheduling requests includes: when determining that the period of the first scheduling request is shorter than the period of the second scheduling request, determining that the priority of the first scheduling request is higher than the priority of the second scheduling request; or when determining that the period of the first scheduling request is longer than the period of the second scheduling request, determining that the priority of the first scheduling request is lower than the priority of the second scheduling request.

The determining the priority of the first scheduling request and the priority of the second scheduling request according to the transmission durations of the scheduling requests includes: when determining that the transmission duration of the first scheduling request is shorter than the transmission duration of the second scheduling request, determining that the priority of the first scheduling request is higher than the priority of the second scheduling request; or when determining that the transmission duration of the first scheduling request is longer than the transmission duration of the second scheduling request, determining that the priority of the first scheduling request is lower than the priority of the second scheduling request.

The determining the priority of the first scheduling request and the priority of the second scheduling request according to the quantities of unsuccessful transmissions of the scheduling requests includes: when determining that the quantity of unsuccessful transmissions of the first scheduling request is greater than the quantity of unsuccessful transmissions of the second scheduling request, determining that the priority of the first scheduling request is higher than the priority of the second scheduling request; or when the terminal device determines that the quantity of unsuccessful transmissions of the first scheduling request is less than the quantity of unsuccessful transmissions of the second scheduling request, determining that the priority of the first scheduling request is lower than the priority of the second scheduling request.

In another example, when the first priority information of the scheduling requests is whether the scheduling requests use the OCCs, the symbol duration information of the scheduling requests, the transmission durations of the scheduling requests, and the quantities of unsuccessful transmissions of the scheduling requests, and the second priority information of the scheduling requests is the periods of the scheduling requests, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request includes: the terminal device determines the priority of the first scheduling request and the priority of the second scheduling request according to the symbol duration information of the scheduling requests; when the terminal device cannot determine the priority of the first scheduling request and the priority of the second scheduling request according to the symbol duration information of the scheduling requests, the terminal device determines the priority of the first scheduling request and the priority of the second scheduling request according to whether the OCCs are used; when the terminal device cannot determine the priority of the first scheduling request and the priority of the second scheduling request according to the symbol duration information of the scheduling requests or according to whether the OCCs are used, the terminal device determines the priority of the first scheduling request and the priority of the second scheduling request according to the periods of the scheduling requests; or when the terminal device cannot determine the priority of the first scheduling request and the priority of the second scheduling request according to the symbol duration information of the scheduling requests, or according to whether the OCCs are used, or according to the periods of the scheduling requests, the terminal device determines the priority of the first scheduling request and the priority of the second scheduling request according to the transmission durations of the scheduling requests. When the terminal device cannot determine the priority of the first scheduling request and the priority of the second scheduling request according to the symbol duration information of the scheduling requests or according to whether the OCCs are used, and cannot determine the priority of the first scheduling request and the priority of the second scheduling request according to the periods of the scheduling requests or according to the transmission durations of the scheduling requests, the terminal device determines the priority of the first scheduling request and the priority of the second scheduling request according to the quantities of unsuccessful transmissions of the scheduling requests. An arrangement sequence of the symbol duration information of the scheduling requests, the transmission durations of the scheduling requests, the quantities of unsuccessful transmissions of the scheduling requests, whether the scheduling requests use the OCCs, and the periods of the scheduling requests used by the terminal device is: the symbol duration information of the scheduling requests, whether the scheduling requests use the OCCs, the periods of the scheduling requests, the transmission durations of the scheduling requests, and the quantities of unsuccessful transmissions of the scheduling requests. For ease of description, the arrangement sequence is hereinafter referred to as a fifth arrangement sequence.

The first priority information of the scheduling requests may be a plurality but not all of the symbol duration information of the scheduling requests, whether the scheduling requests use the OCCs, the transmission durations of the scheduling requests, and the quantities of unsuccessful transmissions of the scheduling requests. For example, when the first priority information of the scheduling requests is the symbol duration information of the scheduling requests, the transmission durations of the scheduling requests, and the quantities of unsuccessful transmissions of the scheduling requests, and the second priority information of the scheduling requests is the periods of the scheduling requests, that the terminal device determines the priority of the first scheduling request and the priority of the second scheduling request according to the first priority information of the first scheduling request, the first priority information of the second scheduling request, the second priority information of the first scheduling request, and the second priority information of the second scheduling request may include: when determining that the duration of each symbol used to carry the first scheduling request is shorter than the duration of each symbol used to carry the second scheduling request, the terminal device may determine that the priority of the first scheduling request is higher than the priority of the second scheduling request; when determining that the duration of each symbol used to carry the first scheduling request is longer than the duration of each symbol used to carry the second scheduling request, the terminal device may determine that the priority of the first scheduling request is lower than the priority of the second scheduling request; when determining that the duration of each symbol used to carry the first scheduling request is equal to the duration of each symbol used to carry the second scheduling request, and the period of the first scheduling request is shorter than the period of the second scheduling request, the terminal device determines that the priority of the first scheduling request is higher than the priority of the second scheduling request; when determining that the duration of each symbol used to carry the first scheduling request is equal to the duration of each symbol used to carry the second scheduling request, and the period of the first scheduling request is longer than the period of the second scheduling request, the terminal device determines that the priority of the first scheduling request is lower than the priority of the second scheduling request; when determining that the duration of each symbol used to carry the first scheduling request is equal to the duration of each symbol used to carry the second scheduling request, and the period of the first scheduling request is equal to the period of the second scheduling request, and the transmission duration of the first scheduling request is shorter than the transmission duration of the second scheduling request, the terminal device determines that the priority of the first scheduling request is higher than the priority of the second scheduling request; when determining that the duration of each symbol used to carry the first scheduling request is equal to the duration of each symbol used to carry the second scheduling request, and the period of the first scheduling request is equal to the period of the second scheduling request, and the transmission duration of the first scheduling request is longer than the transmission duration of the second scheduling request, the terminal device determines that the priority of the first scheduling request is lower than the priority of the second scheduling request; when determining that the duration of each symbol used to carry the first scheduling request is equal to the duration of each symbol used to carry the second scheduling request, and the period of the first scheduling request is equal to the period of the second scheduling request, and the transmission duration of the first scheduling request is equal to the transmission duration of the second scheduling request, and the quantity of unsuccessful transmissions of the first scheduling request is greater than the quantity of unsuccessful transmissions of the second scheduling request, the terminal device determines that the priority of the first scheduling request is higher than the priority of the second scheduling request; or when determining that the duration of each symbol used to carry the first scheduling request is equal to the duration of each symbol used to carry the second scheduling request, and the period of the first scheduling request is equal to the period of the second scheduling request, and the transmission duration of the first scheduling request is equal to the transmission duration of the second scheduling request, and the quantity of unsuccessful transmissions of the first scheduling request is less than the quantity of unsuccessful transmissions of the second scheduling request, the terminal device determines that the priority of the first scheduling request is lower than the priority of the second scheduling request. In conclusion, when the terminal device determines the priority of the first scheduling request and the priority of the second scheduling request, an arrangement sequence of the symbol duration information of the scheduling requests, the transmission durations of the scheduling requests, the quantities of unsuccessful transmissions of the scheduling requests, and the periods of the scheduling requests that are used is: the symbol duration information of the scheduling requests, the periods of the scheduling requests, the transmission durations of the scheduling requests, and the quantities of unsuccessful transmissions of the scheduling requests. For ease of description, the arrangement sequence is hereinafter referred to as a sixth arrangement sequence.

The terminal device may not only determine the priority of the first scheduling request and the priority of the second scheduling request according to the fourth arrangement sequence, the fifth arrangement sequence, and the sixth arrangement sequence, but also determine the priority of the first scheduling request and the priority of the second scheduling request according to other arrangement sequences. A person skilled in the art may determine different arrangement sequences and determine corresponding implementations according to the foregoing technical solutions. Different arrangement sequences and implementations are not exhaustively illustrated herein.

It may be understood that, when determining the priority of the first scheduling request and the priority of the second scheduling request, the terminal device determines the priority of the first scheduling request and the priority of the second scheduling request according to only one of a plurality of arrangement sequences.

Optionally, in some embodiments, when the first priority information of the first scheduling request is the symbol duration information of the scheduling request, the transmission duration of the scheduling request, and the quantity of unsuccessful transmissions of the scheduling request, the terminal device may first determine whether both the quantity of unsuccessful transmissions of the first scheduling request and the quantity of unsuccessful transmissions of the second scheduling request are equal to the preset quantity of times; and directly determine the priority of the first scheduling request and the priority of the second scheduling request according to the determination, or determine the priority of the first scheduling request and the priority of the second scheduling request according to a preset arrangement sequence.

In an embodiment, when determining that the quantity of unsuccessful transmissions of the first scheduling request is equal to the preset quantity of times, and the quantity of unsuccessful transmissions of the second scheduling request is less than the preset quantity of times, the terminal device determines that the priority of the first scheduling request is higher than the priority of the second scheduling request. When determining that the quantity of unsuccessful transmissions of the first scheduling request is less than the preset quantity of times, and the quantity of unsuccessful transmissions of the second scheduling request is equal to the preset quantity of times, the terminal device determines that the priority of the first scheduling request is lower than the priority of the second scheduling request. When determining that both the quantity of unsuccessful transmissions of the first scheduling request and the quantity of unsuccessful transmissions of the second scheduling request are equal to or less than the preset quantity of times, the terminal device determines the priority of the first scheduling request and the priority of the second scheduling request according to a preset arrangement sequence. The preset arrangement sequence may be any one of the fourth arrangement sequence, the fifth arrangement sequence, and the sixth arrangement sequence, or may be an arrangement sequence that is not specifically illustrated.

It may be understood that the terminal device can perform only one of step 303 and step 304. In other words, the priority of the first scheduling request is different from the priority of the second scheduling request. If the terminal device cannot determine the priority of the first scheduling request and the priority of the second scheduling request according to the foregoing rule, the terminal device may determine that a priority of one of the two scheduling requests is higher than that of the other scheduling request, or the terminal device may further determine that a priority of a scheduling request generated earlier is higher than a priority of a scheduling request generated later.

For example, when the first priority information of the scheduling requests includes only the transmission durations of the scheduling requests, and the terminal device does not determine the second priority information of the scheduling requests, and the terminal device determines that the transmission duration of the first scheduling request is equal to the transmission duration of the second scheduling request, the terminal device may determine that one of the two scheduling requests is higher than that of the other scheduling request, or the terminal device may further determine that the priority of the scheduling request generated earlier is higher than the priority of the scheduling request generated later.

In another example, when the first priority information of the scheduling requests includes only the quantities of unsuccessful transmissions of the scheduling requests, and the terminal device does not determine the priority of the second scheduling request, and the terminal device determines that the quantity of unsuccessful transmissions of the first scheduling request is equal to the quantity of unsuccessful transmissions of the second scheduling request, the terminal device may determine that one of the two scheduling requests is higher than that of the other scheduling request, or the terminal device may further determine that the priority of the scheduling request generated earlier is higher than the priority of the scheduling request generated later.

Optionally, in some embodiments, the terminal device may further send a scheduling request of a lower priority to the base station, in addition to a scheduling request of a higher priority.

For example, when the type of the first uplink control channel is the long physical uplink control channel, and the type of the second uplink control channel is the short physical uplink control channel, and the priority of the first scheduling request is higher than the priority of the second scheduling request, the terminal device sends the second scheduling request to the base station, where the first uplink control channel is used to carry the first scheduling request, and the second uplink control channel is used to carry the second scheduling request; or when the type of the first uplink control channel is the long physical uplink control channel, and the type of the second uplink control channel is the short physical uplink control channel, and the priority of the first scheduling request is lower than the priority of the second scheduling request, and when determining that the symbol used to transmit the first scheduling request can carry a demodulation reference signal and uplink control information, the terminal device sends the first scheduling request to the base station. The time domain resource used by the terminal device to send the first scheduling request is different from the time domain resource used to send the second scheduling request.

In another example, when the type of the first uplink control channel is the two-symbol short physical uplink control channel, and the type of the second uplink control channel is the one-symbol short physical uplink control channel, and the priority of the second scheduling request is higher than the priority of the first scheduling request, and the symbol of the second scheduling request collides with the first symbol of the first scheduling request in time domain, the terminal device sends the first scheduling request to the base station. The time domain resource used by the terminal device to send the first scheduling request is different from the time domain resource used to send the second scheduling request.

In another example, if one of the first scheduling request and the second scheduling request uses the OCC, when the type of the first uplink control channel is the long physical uplink control channel, and the type of the second uplink control channel is the one-symbol short uplink control channel, and the priority of the second scheduling request is higher than the priority of the first scheduling request, and the symbol used to transmit the first scheduling request can carry a demodulation reference signal and uplink control information, the terminal device sends a part of the first scheduling request carried by a first frequency resource, where the first frequency domain resource is different from a second frequency domain resource, and the second frequency domain resource is a frequency domain resource used to transmit the second scheduling request; or when the type of the first uplink control channel is the long physical uplink control channel, and the type of the second uplink control channel is the one-symbol short physical uplink control channel, and the priority of the second scheduling request is lower than the priority of the first scheduling request, the terminal device sends the second scheduling request to the base station. A time domain resource of the symbol used to transmit the first scheduling request is different from a time domain resource of the symbol used to transmit the second scheduling request. The time domain resource used by the terminal device to send the first scheduling request is different from the time domain resource used to send the second scheduling request.

When the terminal device can send both the scheduling request of the higher priority and the scheduling request of the lower priority, the terminal device uses different time domain resources to separately send the scheduling request of the higher priority and the scheduling request of the lower priority. In other words, the time domain resource used by the terminal device to send the scheduling request of the higher priority is different from the time domain resource used to send the scheduling request of the lower priority. In an embodiment, when the terminal device sends the scheduling request of the lower priority to the base station, the terminal device may send the scheduling request on a time domain resource on which no collision occurs. In this case, the time domain resource used by the terminal device to send the scheduling request of the lower priority is smaller than a preconfigured time domain resource used to send the scheduling request of the lower priority. This does not cause severe impact on parsing, by the base station, the scheduling request sent by the terminal device.

For example, if the first scheduling request occupies a time domain resource from a time T1 to a time T9, and the second scheduling request occupies a time domain resource from a time T3 to a time T6, and the symbol used to transmit the first scheduling request can carry a demodulation reference signal and uplink control information, and the type of the first uplink control channel is the long physical uplink control channel, and the type of the second uplink control channel is the one-symbol short physical uplink control channel, and the priority of the second scheduling request is higher than the priority of the first scheduling request, the terminal device may send the first scheduling request to the base station at the time T1 to the time T2 and the time T7 to the time T9, and send the second scheduling request to the base station at the time T3 to the time T6. It may be contemplated that, the time domain resource of the symbol used to transmit the first scheduling request is different from the time domain resource of the symbol used to transmit the second scheduling request.

In another example, if the type of the first uplink control channel is the two-symbol short physical uplink control channel, and the type of the second uplink control channel is the one-symbol short physical uplink control channel, and the priority of the second scheduling request is higher than the priority of the first scheduling request, and the symbol of the second scheduling request collides with the first symbol of the first scheduling request in time domain, the terminal device may send the second scheduling request on a time domain resource of the first symbol of the first scheduling request to the base station, and then send the first scheduling request on a time domain resource of the second symbol of the first scheduling request. In other words, in this case, the terminal device uses a time domain resource of only one symbol to send the first scheduling request. Because the scheduling request may be carried by one symbol, the base station can still parse the first scheduling request.

Optionally, in some embodiments, the terminal device may further not send the scheduling request of the lower priority to the base station.

For example, when the type of the first uplink control channel is the long physical uplink control channel, and the type of the second uplink control channel is the short physical uplink control channel, and the priority of the first scheduling request is lower than the priority of the second scheduling request, and when determining that the symbol used to transmit the first scheduling request cannot carry a demodulation reference signal and uplink control information, the terminal device does not send the first scheduling request to the base station.

In another example, when the type of the first uplink control channel is the long physical uplink control channel, and the type of the second uplink control channel is the short physical uplink control channel, and the priority of the first scheduling request is lower than the priority of the second scheduling request, and when determining that the symbol used to transmit the first scheduling request can carry a demodulation reference signal and uplink control information, the terminal device may not send the first scheduling request to the base station either.

In another example, if one of the first scheduling request and the second scheduling request uses the OCC, when the type of the first uplink control channel is the long physical uplink control channel, and the type of the second uplink control channel is the one-symbol short physical uplink control channel, and the priority of the second scheduling request is higher than the priority of the first scheduling request, and the symbol used to transmit the first scheduling request cannot carry a demodulation reference signal and uplink control information, the terminal device does not send a part of the first scheduling request carried by a first frequency resource to the base station, where the first frequency domain resource is different from a second frequency domain resource, and the second frequency domain resource is a frequency domain resource used to transmit the second scheduling request.

In another example, if one of the first scheduling request and the second scheduling request uses the OCC, when the type of the first uplink control channel is the long physical uplink control channel, and the type of the second uplink control channel is the one-symbol short physical uplink control channel, and the priority of the second scheduling request is higher than the priority of the first scheduling request, and the symbol used to transmit the first scheduling request can carry a demodulation reference signal and uplink control information, the terminal device may not send a part of the first scheduling request carried by a first frequency resource to the base station either, where the first frequency domain resource is different from a second frequency domain resource, and the second frequency domain resource is a frequency domain resource used to transmit the second scheduling request.

In another example, if one of the first scheduling request and the second scheduling request uses the OCC, when the type of the first uplink control channel is the two-symbol short physical uplink control channel, and the type of the second uplink control channel is the one-symbol short physical uplink control channel, and the priority of the first scheduling request is lower than the priority of the second scheduling request, the terminal device does not send the first scheduling request to the base station.

For example, if the first scheduling request occupies a time domain resource from a time T1 to a time T9, and the second scheduling request occupies a time domain resource from a time T3 to a time T6, and the symbol used to transmit the first scheduling request can carry a demodulation reference signal and uplink control information, and the type of the first uplink control channel is the long physical uplink control channel, and the type of the second uplink control channel is the one-symbol short physical uplink control channel, and the priority of the second scheduling request is higher than the priority of the first scheduling request, the terminal device may not send the first scheduling request to the base station at the time T1 to the time T2 and the time T7 to the time T9, but send the second scheduling request to the base station at the time T3 to the time T6.

Figure 4:
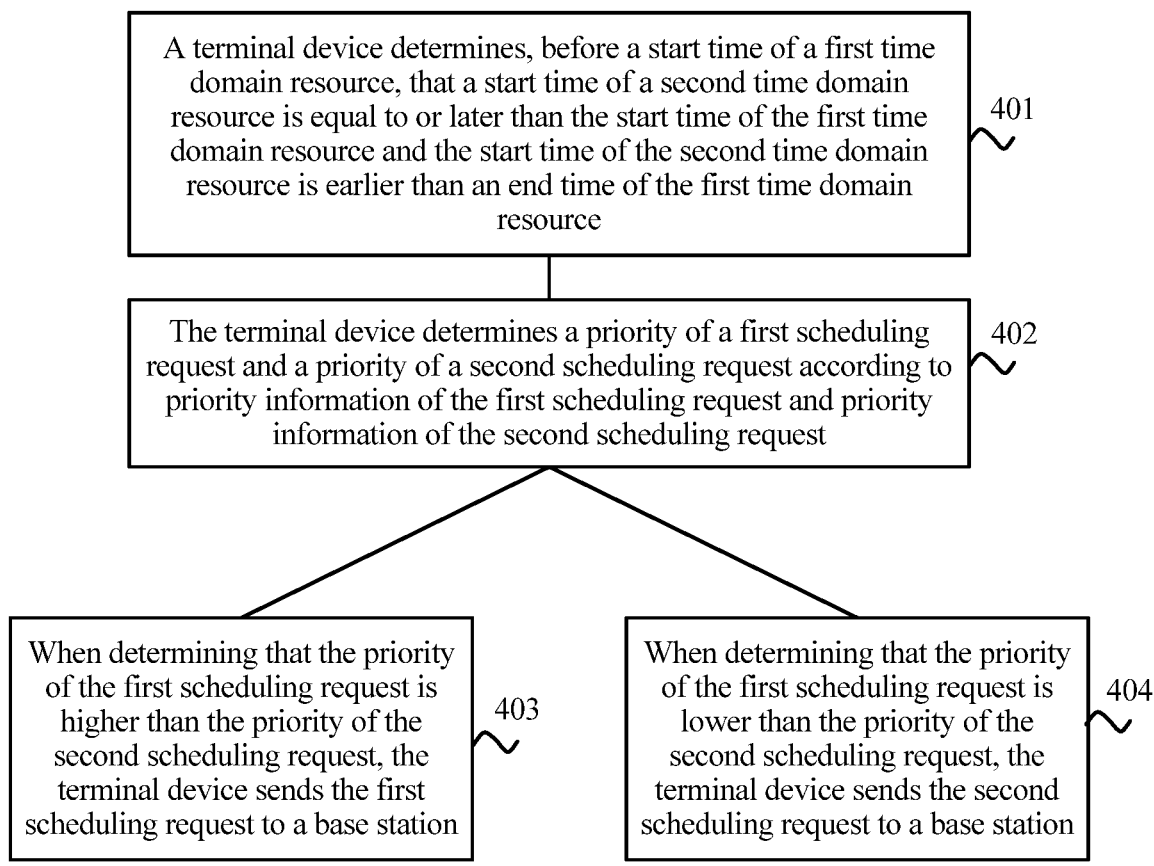
FIG. 4 is a schematic flowchart of another method for determining priorities of scheduling requests according to an embodiment.

FIG. 4 is a schematic flowchart of another method for determining priorities of scheduling requests according to an embodiment.

In step 401, a terminal device determines, before a start time of a first time domain resource, that a start time of a second time domain resource is equal to or later than the start time of the first time domain resource and the start time of the second time domain resource is earlier than an end time of the first time domain resource, where the first time domain resource is used to transmit a first scheduling request, and the second time domain resource is used to transmit a second scheduling request.

In step 402, the terminal device determines a priority of the first scheduling request and a priority of the second scheduling request according to priority information of the first scheduling request and priority information of the second scheduling request, where the priority information of the scheduling requests is any one or more of the following information: service types of the scheduling requests and periods of the scheduling requests.

In step 403, when determining that the priority of the first scheduling request is higher than the priority of the second scheduling request, the terminal device sends the first scheduling request to a base station.

In step 404, when determining that the priority of the first scheduling request is lower than the priority of the second scheduling request, the terminal device sends the second scheduling request to the base station.

According to the technical solution shown in FIG. 4, before transmitting the scheduling requests, the terminal device can determine the priorities of the two scheduling requests that will collide, and select, according to the determination, an appropriate scheduling request for sending to the base station.

Optionally, in some embodiments, when the priority information of the scheduling requests is the service types of the scheduling requests, that the terminal device determines a priority of the first scheduling request and a priority of the second scheduling request according to priority information of the first scheduling request and priority information of the second scheduling request includes: when determining that a service type of the first scheduling request is URLLC and a service type of the second scheduling request is enhanced mobile broadband (eMBB), the terminal device determines that the priority of the first scheduling request is higher than the priority of the second scheduling request; or when determining that a service type of the second scheduling request is URLLC and a service type of the first scheduling request is eMBB, the terminal device determines that the priority of the second scheduling request is higher than the priority of the first scheduling request.

Optionally, in some embodiments, when the priority information of the scheduling requests is the periods of the scheduling requests, that the terminal device determines a priority of the first scheduling request and a priority of the second scheduling request according to priority information of the first scheduling request and priority information of the second scheduling request includes: when determining that a period of the first scheduling request is shorter than a period of the second scheduling request, the terminal device determines that the priority of the first scheduling request is higher than the priority of the second scheduling request; or when determining that a period of the second scheduling request is shorter than a period of the first scheduling request, the terminal device determines that the priority of the second scheduling request is higher than the priority of the first scheduling request.

Optionally, in some embodiments, when the priority information of the scheduling requests is the service types of the scheduling requests and the periods of the scheduling requests, that the terminal device determines a priority of the first scheduling request and a priority of the second scheduling request according to priority information of the first scheduling request and priority information of the second scheduling request includes: when determining that a service type of the first scheduling request is URLLC and a service type of the second scheduling request is eMBB, the terminal device determines that the priority of the first scheduling request is higher than the priority of the second scheduling request; when determining that a service type of the second scheduling request is URLLC and a service type of the first scheduling request is eMBB, the terminal device determines that the priority of the second scheduling request is higher than the priority of the first scheduling request; when determining that a service type of the first scheduling request is the same as a service type of the second scheduling request (that is, both are URLLC or eMBB) and a period of the first scheduling request is shorter than a period of the second scheduling request, the terminal device determines that the priority of the first scheduling request is higher than the priority of the second scheduling request; or when determining that a service type of the first scheduling request is the same as a service type of the second scheduling request (that is, both are URLLC or eMBB) and a period of the second scheduling request is shorter than a period of the first scheduling request, the terminal device determines that the priority of the second scheduling request is higher than the priority of the first scheduling request.

Optionally, in some embodiments, when the priority information of the scheduling requests is the service types of the scheduling requests and the periods of the scheduling requests, that the terminal device determines a priority of the first scheduling request and a priority of the second scheduling request according to priority information of the first scheduling request and priority information of the second scheduling request includes: when determining that a period of the first scheduling request is shorter than a period of the second scheduling request, the terminal device determines that the priority of the first scheduling request is higher than the priority of the second scheduling request; when determining that a period of the second scheduling request is shorter than a period of the first scheduling request, the terminal device determines that the priority of the second scheduling request is higher than the priority of the first scheduling request; when determining that a period of the first scheduling request is equal to a period of the second scheduling request, and a service type of the first scheduling request is URLLC, and a service type of the second scheduling request is eMBB, the terminal device determines that the priority of the first scheduling request is higher than the priority of the second scheduling request; or when determining that a period of the first scheduling request is equal to a period of the second scheduling request, and a service type of the second scheduling request is URLLC, and a service type of the first scheduling request is eMBB, the terminal device determines that the priority of the second scheduling request is higher than the priority of the first scheduling request.

Figure 5:
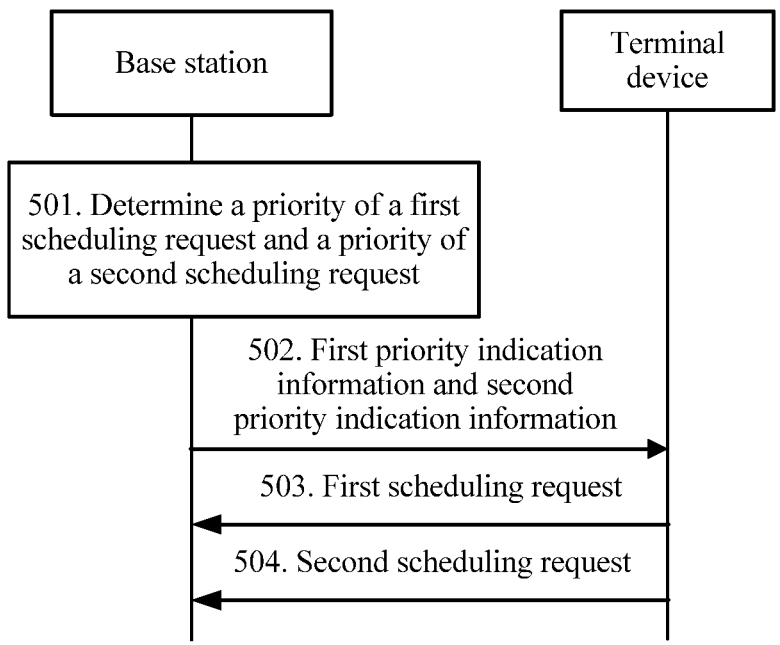
FIG. 5 is a schematic flowchart of another method for determining priorities of scheduling requests according to an embodiment.

FIG. 5 is a schematic flowchart of another method for determining priorities of scheduling requests according to an embodiment.

In step 501, a base station determines a priority of a first scheduling request and a priority of a second scheduling request.

In step 502, the base station sends first priority indication information and second priority indication information to a terminal device, where the first priority indication information is used to indicate the priority of the first scheduling request, and the second priority indication information is used to indicate the priority of the second scheduling request.

In step 503, when determining that a resource used to transmit the first scheduling request collides with a resource used to transmit the second scheduling request and the priority of the first scheduling request is higher than the priority of the second scheduling request, the terminal device sends the first scheduling request to the base station.

In step 504, when determining that a resource used to transmit the first scheduling request collides with a resource used to transmit the second scheduling request and the priority of the first scheduling request is lower than the priority of the second scheduling request, and when sending the second scheduling request to the base station, the terminal device sends the scheduling request of the higher priority in the first scheduling request and the second scheduling request to the base station.

According to the technical solution shown in FIG. 5, the base station may be responsible for determining priorities of different scheduling requests, and sending the determination to the terminal device. Therefore, the terminal device can determine priorities of different scheduling requests directly according to an indication from the base station.

Optionally, in some embodiments, that a base station determines a priority of a first scheduling request and a priority of a second scheduling request includes: when determining that a duration of each symbol carrying the first scheduling request is shorter than a duration of each symbol carrying the second scheduling request, the base station determines that the priority of the first scheduling request is higher than the priority of the second scheduling request; or when determining that a duration of each symbol carrying the first scheduling request is longer than a duration of each symbol carrying the second scheduling request, the base station determines that the priority of the first scheduling request is lower than the priority of the second scheduling request.

Optionally, in some embodiments, that a base station determines a priority of a first scheduling request and a priority of a second scheduling request includes: when determining that a spacing between subcarriers used to carry the first scheduling request is greater than a spacing between subcarriers used to carry the second scheduling request, the base station determines that the priority of the first scheduling request is higher than the priority of the second scheduling request; or when determining that a spacing between carriers used to carry the first scheduling request is less than a spacing between subcarriers used to carry the second scheduling request, the base station determines that the priority of the second scheduling request is higher than the priority of the first scheduling request.

Optionally, in other embodiments, that a base station determines a priority of a first scheduling request and a priority of a second scheduling request includes: when determining that a transmission duration of the first scheduling request is shorter than a transmission duration of the second scheduling request, the base station determines that the priority of the first scheduling request is higher than the priority of the second scheduling request; or when determining that a transmission duration of the first scheduling request is longer than a transmission duration of the second scheduling request, the base station determines that the priority of the first scheduling request is lower than the priority of the second scheduling request.

Optionally, in some embodiments, that a base station determines a priority of a first scheduling request and a priority of a second scheduling request includes: when determining that at least one of the first scheduling request and the second scheduling request uses the OCC, the base station determines a type of a first uplink control channel and a type of a second uplink control channel, where the first uplink control channel is used to carry the first scheduling request, and the second uplink control channel is used to carry the second scheduling request; and when determining that the type of the first uplink control channel is a long physical uplink control channel, and the type of the second uplink control channel is a one-symbol short physical uplink control channel or a two-symbol short physical uplink control channel, and a time domain location of a first symbol on the first uplink control channel or a time domain location of a first symbol in a frequency hopping part of the first uplink control channel is the same as a time domain location of a first symbol on the second uplink control channel, the base station determines that the priority of the second scheduling request is higher than the priority of the first scheduling request; when determining that the type of the first uplink control channel is the long physical uplink control channel, and the type of the second uplink control channel is the one-symbol short physical uplink control channel or the two-symbol short physical uplink control channel, and a time domain location of any symbol other than a first symbol on the first uplink control channel and a first symbol in a frequency hopping part thereof is the same as a time domain location of a first symbol on the second uplink control channel, the base station determines that the priority of the first scheduling request is higher than the priority of the second scheduling request; or when determining that the type of the first uplink control channel is the long physical uplink control channel, and the type of the second uplink control channel is a two-symbol short physical uplink control channel, and a time domain location of a first symbol on the first uplink control channel or a time domain location of a first symbol in a frequency hopping part of the first uplink control channel is the same as a time domain location of a second symbol on the second uplink control channel, and the first scheduling request uses the OCC, the base station determines that the priority of the first scheduling request is lower than the priority of the second scheduling request.

Optionally, in some embodiments, that a base station determines a priority of a first scheduling request and a priority of a second scheduling request includes: when determining that a service type of the first scheduling request is URLLC and a service type of the second scheduling request is enhanced mobile broadband, the base station determines that the priority of the first scheduling request is higher than the priority of the second scheduling request; or when determining that a service type of the second scheduling request is URLLC and a service type of the first scheduling request is enhanced mobile broadband, the base station determines that the priority of the second scheduling request is higher than the priority of the first scheduling request.

Optionally, in some embodiments, that a base station determines a priority of a first scheduling request and a priority of a second scheduling request includes: when determining that a period of the first scheduling request is shorter than a period of the second scheduling request, the base station determines that the priority of the first scheduling request is higher than the priority of the second scheduling request; or when determining that a period of the second scheduling request is shorter than a period of the first scheduling request, the base station determines that the priority of the second scheduling request is higher than the priority of the first scheduling request.

Optionally, in some embodiments, the base station may further determine the priority of the first scheduling request and the priority of the second scheduling request according to at least two of symbol duration information of the scheduling requests, transmission durations of the scheduling requests, whether the scheduling requests use the OCCs, service types of the scheduling requests, and periods of the scheduling requests. An implementation in which the base station determines the priority of the first scheduling request and the priority of the second scheduling request according to at least two of the symbol duration information of the scheduling requests, the transmission durations of the scheduling requests, whether the scheduling requests use the OCCs, the service types of the scheduling requests, and the periods of the scheduling requests is similar to the implementation in which the terminal device determines the priority of the first scheduling request and the priority of the second scheduling request according to the first priority information of the scheduling requests or according to the first priority information and the second priority information of the scheduling requests in the embodiment shown in FIG. 1. The implementations are not exhaustively illustrated herein in this embodiment.

Optionally, in some embodiments, that a resource used to transmit the first scheduling request collides with a resource used to transmit the second scheduling request in step 503 and step 504 is that a time domain resource used to transmit the first scheduling request collides with a time domain resource used to transmit the second scheduling request.

Figure 6:
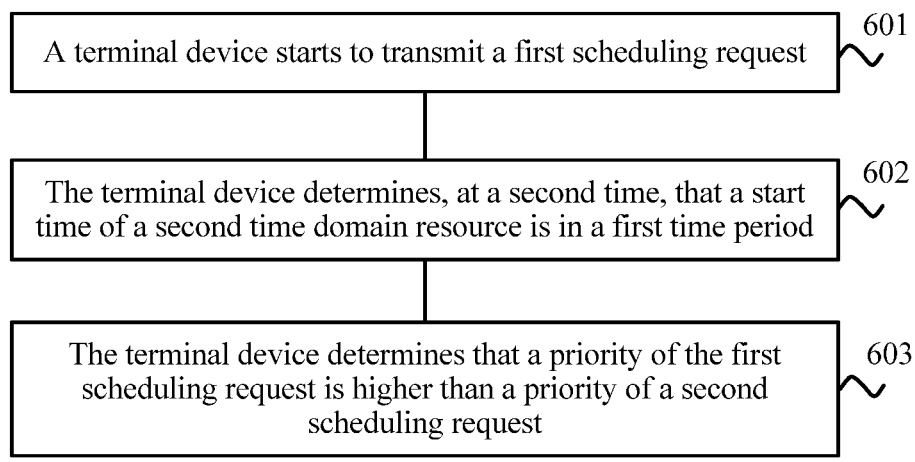
FIG. 6 is a schematic flowchart of another method for determining priorities of scheduling requests according to an embodiment.

FIG. 6 is a schematic flowchart of another method for determining priorities of scheduling requests according to an embodiment.

In step 601, a terminal device starts to transmit a first scheduling request.

In step 602, the terminal device determines, at a second time, that a start time of a second time domain resource is in a first time period, where the second time is any time other than an end time of a first time domain resource, a start time of the first time period is the second time, an end time of the first time period is the end time of the first time domain resource, the first time domain resource is a time domain resource used to transmit the first scheduling request, and the second time domain resource is a time domain resource used to transmit the second scheduling request.

In step 603, the terminal device determines that a priority of the first scheduling request is higher than a priority of the second scheduling request.

According to the technical solution shown in FIG. 6, in a process in which the terminal device transmits the first scheduling request, if the second scheduling request is required, and the first time domain resource collides with the first time domain resource, the terminal device may continue to transmit the first scheduling request, thereby avoiding an interruption of transmission of the first scheduling request.

It may be understood that, a case in which two scheduling requests collide is described in the foregoing embodiment. In some embodiments, three or more scheduling requests may collide. In this case, a manner of determining priorities of the three or more scheduling requests is the same as the manner of determining priorities of two scheduling requests. In other words, priorities of any two of the three or more scheduling requests may be first determined according to the technical solution in the foregoing embodiment. Then a sequence of priorities of all scheduling requests is determined according to the determination. When sending a scheduling request, the terminal device sends a scheduling request of the highest priority in the three or more scheduling requests.

For example, it is assumed that time domain resources of three scheduling requests collide. A priority of a scheduling request 1 and a priority of a scheduling request 2 may be determined according to the foregoing technical solution, then the priority of the scheduling request 2 and a priority of a scheduling request 3 may be determined according to the foregoing technical solution, and then the priority of the scheduling request 1 and the priority of the scheduling request 3 may be determined according to the foregoing technical solution. In other words, a sequence of priorities of the three scheduling requests may be determined after a sequence of priorities of any two of the three scheduling requests is determined separately. In this way, a sequence of priorities of the three scheduling requests can be determined. When sending a scheduling request, the terminal device sends a scheduling request of the highest priority in the three scheduling requests.

Certainly, three or more scheduling requests may also be determined simultaneously according to the solution in the foregoing embodiment.

For example, it is assumed that time domain resources of three scheduling requests collide, and first priority information of the scheduling requests is transmission durations of the scheduling requests. In this case, a sequence of priorities of the three scheduling requests may be determined in a single attempt according to the transmission durations of the three scheduling requests. When sending a scheduling request, the terminal device sends a scheduling request of the highest priority in the three scheduling requests.

Figure 7:
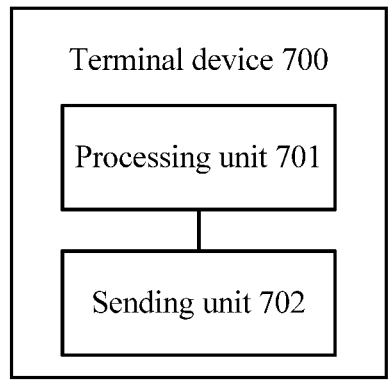
FIG. 7 is a structural block diagram of a terminal device according to an embodiment.

FIG. 7 is a structural block diagram of a terminal device according to an embodiment. As shown in FIG. 7, the terminal device 700 includes a processing unit 701 and a sending unit 702.

The processing unit 701 is configured to determine that a first time domain resource collides with a second time domain resource, where the first time domain resource is used to transmit a first scheduling request, and the second time domain resource is used to transmit a second scheduling request.

The processing unit 701 is further configured to determine a priority of the first scheduling request and a priority of the second scheduling request according to first priority information of the first scheduling request and first priority information of the second scheduling request, where the first priority information of the scheduling requests is any one or more of the following information: symbol duration information of the scheduling requests, transmission durations of the scheduling requests, quantities of unsuccessful transmissions of the scheduling requests, and whether the scheduling requests use OCCs, and the symbol duration information of the scheduling requests is used to indicate a duration of each symbol carrying the scheduling requests.

The sending unit 702 is configured to send the first scheduling request to a base station when the processing unit 701 determines that the priority of the first scheduling request is higher than the priority of the second scheduling request.

The sending unit 702 is further configured to send the second scheduling request to the base station when the processing unit 701 determines that the priority of the first scheduling request is lower than the priority of the second scheduling request.

The terminal device 700 shown in FIG. 7 may perform each step performed by the terminal device in the method shown in FIG. 3. For functions and beneficial effects of units of the terminal device 700, refer to the method shown in FIG. 3. Details are not described again herein.

The processing unit 701 may be implemented by a processor, and the sending unit 702 may be implemented by a transceiver.

Figure 8:
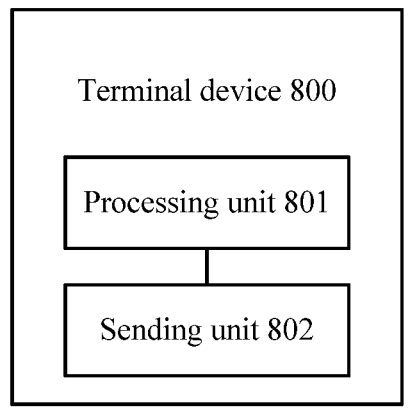
FIG. 8 is a structural block diagram of a terminal device according to an embodiment.

FIG. 8 is a structural block diagram of a terminal device according to an embodiment. As shown in FIG. 8, the terminal device 800 includes a processing unit 801 and a sending unit 802.

The processing unit 801 is configured to determine, before a start time of a first time domain resource, that a start time of a second time domain resource is equal to or later than the start time of the first time domain resource and the start time of the second time domain resource is earlier than an end time of the first time domain resource, where the first time domain resource is used to transmit a first scheduling request, and the second time domain resource is used to transmit a second scheduling request.

The processing unit 801 is further configured to determine a priority of the first scheduling request and a priority of the second scheduling request according to priority information of the first scheduling request and priority information of the second scheduling request, where the priority information of the scheduling requests is any one or more of the following information: service types of the scheduling requests and periods of the scheduling requests.

The sending unit 802 is configured to send the first scheduling request to a base station when the processing unit 801 determines that the priority of the first scheduling request is higher than the priority of the second scheduling request.

The sending unit 802 is further configured to send the second scheduling request to the base station when the processing unit 801 determines that the priority of the first scheduling request is lower than the priority of the second scheduling request.

The terminal device 800 shown in FIG. 8 may perform each step performed by the terminal device in the method shown in FIG. 4. For functions and beneficial effects of units of the terminal device 800, refer to the method shown in FIG. 4. Details are not described again herein for the sake of brevity.

The processing unit 801 may be implemented by a processor, and the sending unit 802 may be implemented by a transceiver.

Figure 9:
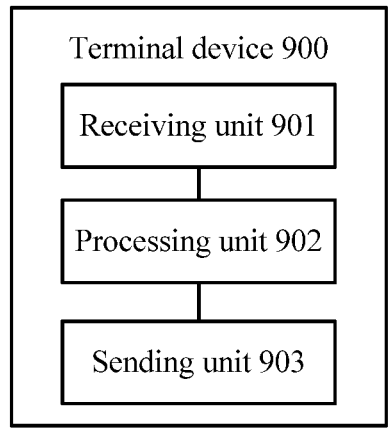
FIG. 9 is a structural block diagram of a terminal device according to an embodiment.

FIG. 9 is a structural block diagram of a terminal device according to an embodiment. As shown in FIG. 9, the terminal device 900 includes a receiving unit 901, a processing unit 902, and a sending unit 903.

The receiving unit 901 is configured to receive first priority indication information and second priority indication information sent by a base station, where the first priority indication information is used to indicate a priority of a first scheduling request, and the second priority indication information is used to indicate a priority of a second scheduling request.

The processing unit 902 is configured to determine that a resource used to transmit the first scheduling request collides with a resource used to transmit the second scheduling request, and determine the priority of the first scheduling request and the priority of the second scheduling request.

The sending unit 903 is configured to send the first scheduling request to the base station when the processing unit 902 determines that the priority of the first scheduling request is higher than the priority of the second scheduling request.

The sending unit 903 is further configured to send a scheduling request of a higher priority in the first scheduling request and the second scheduling request to the base station when the processing unit 902 determines that the priority of the first scheduling request is lower than the priority of the second scheduling request.

The terminal device 900 shown in FIG. 9 may perform each step performed by the terminal device in the method shown in FIG. 5. For functions and beneficial effects of units of the terminal device 900, refer to the method shown in FIG. 5. Details are not described again herein.

The processing unit 902 may be implemented by a processor, and the receiving unit 901 and the sending unit 903 may be implemented by a transceiver.

Figure 10:
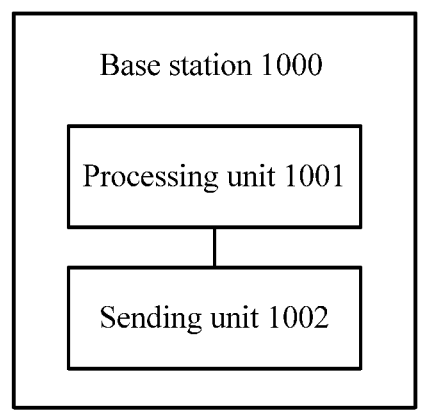
FIG. 10 is a structural block diagram of a base station according to an embodiment.

FIG. 10 is a structural block diagram of a base station according to an embodiment. As shown in FIG. 10, the base station 1000 includes a processing unit 1001 and a sending unit 1002.

The processing unit 1001 is configured to determine a priority of a first scheduling request and a priority of a second scheduling request.

The sending unit 1002 is configured to send first priority indication information and second priority indication information to a terminal device, where the first priority indication information is used to indicate the priority of the first scheduling request, and the second priority indication information is used to indicate the priority of the second scheduling request.

The base station 1000 shown in FIG. 10 may perform each step performed by the base station shown in FIG. 5. For functions and beneficial effects of units of the base station 1000, refer to the method shown in FIG. 5. Details are not described again herein for the sake of brevity.

The processing unit 1001 may be implemented by a processor, and the sending unit 1102 may be implemented by a transceiver.

Figure 11:
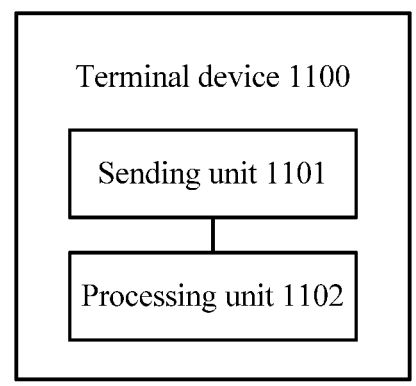
FIG. 11 is a structural block diagram of a terminal device according to an embodiment.

FIG. 11 is a structural block diagram of a terminal device according to an embodiment. As shown in FIG. 11, the terminal device 1100 includes a sending unit 1101 and a processing unit 1102.

The sending unit 1101 is configured to transmit a first scheduling request.

The processing unit 1102 is configured to determine, at a second time, that a start time of a second time domain resource is in a first time period, where the second time is any time other than an end time of a first time domain resource, a start time of the first time period is the second time, an end time of the first time period is the end time of the first time domain resource, the first time domain resource is a time domain resource used to transmit the first scheduling request, and the second time domain resource is a time domain resource used to transmit the second scheduling request.

The processing unit 1102 is further configured to determine that a priority of the first scheduling request is higher than a priority of the second scheduling request.

When the processing unit 1102 determines that the start time of the second time domain resource is in the first time period, the sending unit 1101 has started to transmit the first scheduling request.

The terminal device 1100 shown in FIG. 11 may perform each step performed by the terminal device in the method shown in FIG. 6. For functions and beneficial effects of units of the terminal device 1100, refer to the method shown in FIG. 6. Details are not described again herein.

The processing unit 1102 may be implemented by a processor, and the sending unit 1101 may be implemented by a transceiver.

Figure 12:
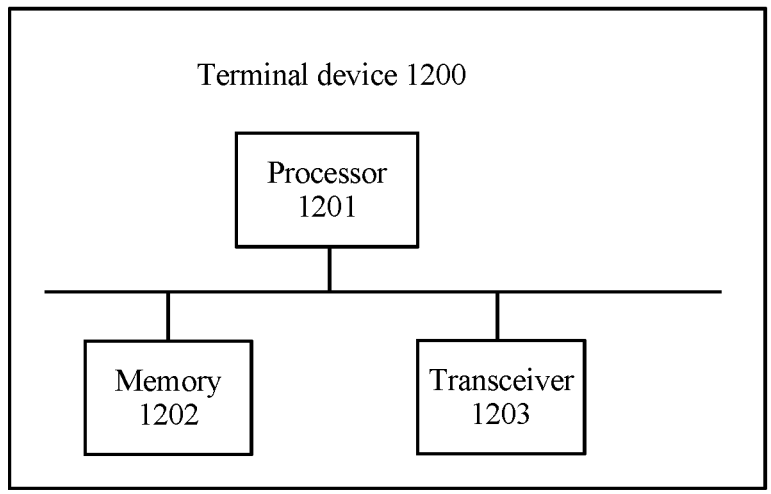
FIG. 12 is a structural block diagram of a terminal device according to an embodiment.

FIG. 12 is a structural block diagram of a terminal device according to an embodiment. The terminal device 1200 shown in FIG. 12 includes a processor 1201, a memory 1202, and a transceiver 1203.

The method disclosed by the foregoing embodiment of the present invention may be applied to the processor 1201 or implemented by the processor 1201. The processor 1201 may be an integrated circuit chip and has a signal processing capability. In an implementation process, each step of the foregoing method may be completed by using an integrated logical circuit of hardware in the processor 1201 or an instruction in a form of software. The processor 1201 may be a general processor, a digital signal processor (DSP), an application-specific integrated circuit (ASIC), a field programmable gate array (FPGA) or another programmable logic device, a discrete gate or transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software modules may be located in a storage medium known in the art, such as a random access memory (RAM), a flash memory, a read-only memory (ROM), a programmable read-only memory, an electrically-erasable programmable memory, or a register. The storage medium is located in the memory 1202. The processor 1201 reads instructions in the memory 1202 and completes, in combination with the transceiver 1203, the method shown in FIG. 3.

Figure 13:
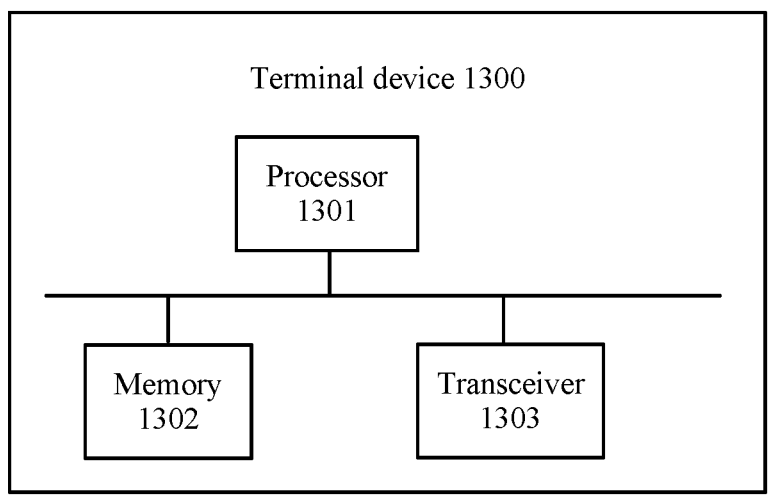
FIG. 13 is a structural block diagram of a terminal device according to an embodiment.

FIG. 13 is a structural block diagram of a terminal device according to an embodiment. The terminal device 1300 shown in FIG. 13 includes a processor 1301, a memory 1302, and a transceiver 1303.

The method disclosed by the foregoing embodiment of the present invention may be applied to the processor 1301 or implemented by the processor 1301. The processor 1301 may be an integrated circuit chip and has a signal processing capability. In an implementation process, each step of the foregoing method may be completed by using an integrated logical circuit of hardware in the processor 1301 or an instruction in a form of software. The processor 1301 may be a general processor, a DSP, an ASIC, a FPGA or another programmable logic device, a discrete gate or transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software modules may be located in a storage medium known in the art, such as a RAM, a flash memory, a ROM, a programmable read-only memory, an electrically-erasable programmable memory, or a register. The storage medium is located in the memory 1302. The processor 1301 reads instructions in the memory 1302 and completes, in combination with the transceiver 1303, the method shown in FIG. 4.

Figure 14:
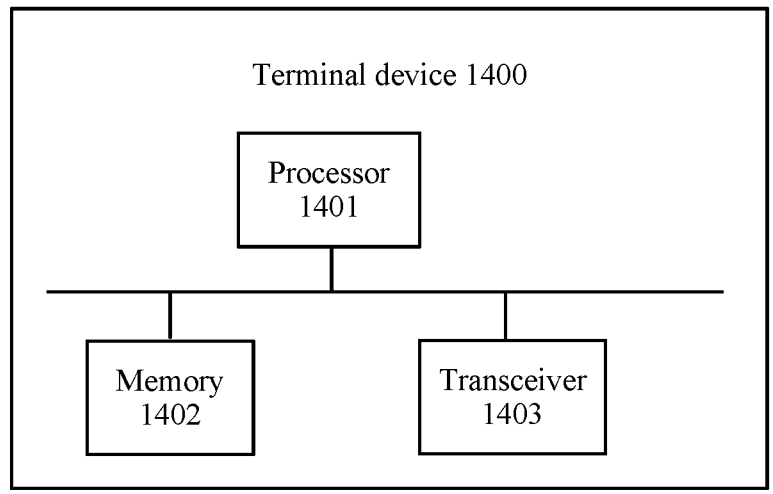
FIG. 14 is a structural block diagram of a terminal device according to an embodiment.

FIG. 14 is a structural block diagram of a terminal device according to an embodiment. The terminal device 1400 shown in FIG. 14 includes a processor 1401, a memory 1402, and a transceiver 1403.

The method disclosed by the foregoing embodiment of the present invention may be applied to the processor 1401 or implemented by the processor 1401. The processor 1401 may be an integrated circuit chip and has a signal processing capability. In an implementation process, each step of the foregoing method may be completed by using an integrated logical circuit of hardware in the processor 1401 or an instruction in a form of software. The processor 1401 may be a general processor, a DSP, an ASIC, a FPGA or another programmable logic device, a discrete gate or transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software modules may be located in a storage medium known in the art, such as a RAM, a flash memory, a ROM, a programmable read-only memory, an electrically-erasable programmable memory, or a register. The storage medium is located in the memory 1402. The processor 1401 reads instructions in the memory 1402 and completes, in combination with the transceiver 1403, each step performed by the terminal device in the method shown in FIG. 5.

Figure 15:
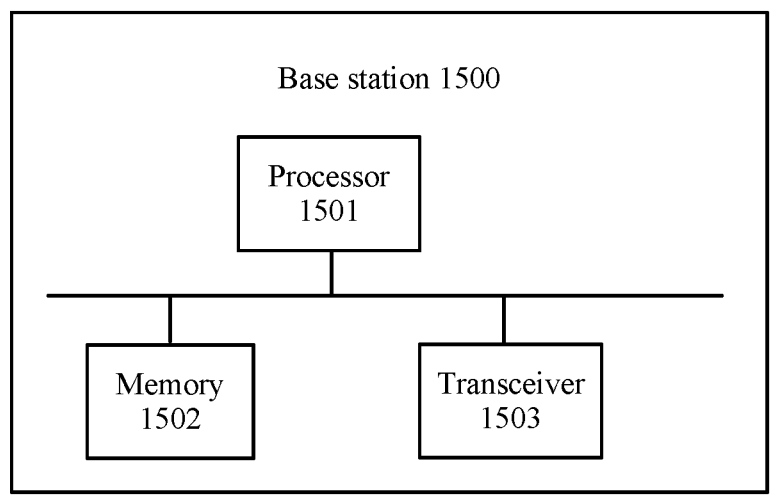
FIG. 15 is a structural block diagram of a base station according to an embodiment.

FIG. 15 is a structural block diagram of a base station according to an embodiment. The base station 1500 shown in FIG. 15 includes a processor 1501, a memory 1502, and a transceiver 1503.

The method disclosed by the foregoing embodiment of the present invention may be applied to the processor 1501 or implemented by the processor 1501. The processor 1501 may be an integrated circuit chip and has a signal processing capability. In an implementation process, each step of the foregoing method may be completed by using an integrated logical circuit of hardware in the processor 1501 or an instruction in a form of software. The processor 1501 may be a general processor, a DSP, an ASIC, a FPGA or another programmable logic device, a discrete gate or transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software modules may be located in a storage medium known in the art, such as a RAM, a flash memory, a ROM, a programmable read-only memory, an electrically-erasable programmable memory, or a register. The storage medium is located in the memory 1502. The processor 1501 reads instructions in the memory 1502 and completes, in combination with the transceiver 1503, each step performed by the base station in the method shown in FIG. 5.

Figure 16:
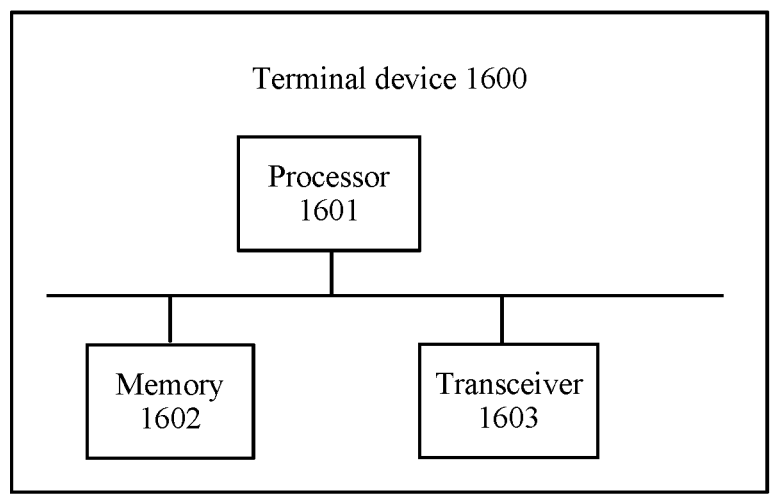
FIG. 16 is a structural block diagram of a terminal device according to an embodiment.

FIG. 16 is a structural block diagram of a terminal device according to an embodiment. The terminal device 1600 shown in FIG. 16 includes a processor 1601, a memory 1602, and a transceiver 1603.

The method disclosed by the foregoing embodiment of the present invention may be applied to the processor 1601 or implemented by the processor 1601. The processor 1601 may be an integrated circuit chip and has a signal processing capability. In an implementation process, each step of the foregoing method may be completed by using an integrated logical circuit of hardware in the processor 1601 or an instruction in a form of software. The processor 1601 may be a general processor, a DSP, an ASIC, a FPGA or another programmable logic device, a discrete gate or transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software modules may be located in a storage medium known in the art, such as a RAM, a flash memory, a ROM, a programmable read-only memory, an electrically-erasable programmable memory, or a register. The storage medium is located in the memory 1602. The processor 1601 reads instructions in the memory 1602 and completes, in combination with the transceiver 1603, the method shown in FIG. 6.

An embodiment further provides a computer storage medium storing a computer program, where the computer program is used to perform the steps performed by the terminal device in the method shown in FIG. 3.

An embodiment further provides a computer storage medium storing a computer program, where the computer program is used to perform the steps performed by the terminal device in the method shown in FIG. 4.

An embodiment further provides a computer storage medium storing a computer program, where the computer program is used to perform the steps performed by the terminal device in the method shown in FIG. 5.

An embodiment further provides a computer storage medium storing a computer program, where the computer program is used to perform the steps performed by the base station in the method shown in FIG. 5.

An embodiment further provides a computer storage medium storing a computer program, where the computer program is used to perform the steps performed by the terminal device in the method shown in FIG. 6.

An embodiment further provides a computer program product including an instruction, and when the computer program product runs on a computer, the computer performs the steps performed by the terminal device in the method shown in FIG. 3.

An embodiment further provides a computer program product including an instruction, and when the computer program product runs on a computer, the computer performs the steps performed by the terminal device in the method shown in FIG. 4.

An embodiment further provides a computer program product including an instruction, and when the computer program product runs on a computer, the computer performs the steps performed by the terminal device in the method shown in FIG. 5.

An embodiment further provides a computer program product including an instruction, and when the computer program product runs on a computer, the computer performs the steps performed by the base station in the method shown in FIG. 5.

An embodiment further provides a computer program product including an instruction, and when the computer program product runs on a computer, the computer performs the steps performed by the terminal device in the method shown in FIG. 6.

A person of ordinary skill in the art may be aware that, the units and algorithm steps in the examples described with reference to the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the system, apparatus, and unit, refer to a corresponding process in the method embodiments. Details are not described herein again for the sake of brevity.

In the embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely exemplary implementations, but are not intended to limit the protection scope of the embodiments. Any variation or replacement readily figured out by a person skilled in the art within the technical scope disclosed herein shall fall within the protection scope of the embodiments. Therefore, the protection scope of the embodiments shall be subject to the protection scope of the claims.

What is claimed is:

1. A method for determining priorities of scheduling requests, comprising:
   determining, by a terminal device, that a first time domain resource collides with a second time domain resource, wherein the first time domain resource is used to transmit a first scheduling request, and the second time domain resource is used to transmit a second scheduling request;
   determining, by the terminal device, a priority of the first scheduling request and a priority of the second scheduling request according to first priority information of the first scheduling request and first priority information of the second scheduling request, wherein the first priority information of the scheduling requests is at least one of: symbol duration information of the scheduling requests, transmission durations of the scheduling requests, quantities of unsuccessful transmissions of the scheduling requests, and whether the scheduling requests use orthogonal cover codes (OCCs), and the symbol duration information of the scheduling requests is used to indicate a duration of each symbol carrying the scheduling requests;

if the priority of the first scheduling request is higher than the priority of the second scheduling request, sending, by the terminal device, the first scheduling request to a base station; or if the priority of the first scheduling request is lower than the priority of the second scheduling request, sending, by the terminal device, the second scheduling request to the base station;

wherein the determining, by the terminal device, that the first time domain resource collides with the second time domain resource further comprises:

determining, by the terminal device before the first time or at the first time, that a start time of one of the first time domain resource and the second time domain resource is later than a start time of the other time domain resource and earlier than an end time of the other time domain resource, wherein the first time is the start time of the other time domain resource.

2. The method according to claim 1, wherein the determining, by the terminal device, that a first time domain resource collides with a second time domain resource further comprises:

determining, by the terminal device, that a start time of the first time domain resource is the same as a start time of the second time domain resource.

3. The method according to claim 1, wherein when the first priority information of the scheduling requests is the symbol duration information of the scheduling requests, the determining, by the terminal device, the priority of the first scheduling request and the priority of the second scheduling request according to the first priority information of the first scheduling request and the first priority information of the second scheduling request further comprises:

if a duration of each symbol carrying the first scheduling request is shorter than a duration of each symbol carrying the second scheduling request, determining, by the terminal device, that the priority of the first scheduling request is higher than the priority of the second scheduling request; or if the duration of each symbol carrying the first scheduling request is longer than the duration of each symbol carrying the second scheduling request, determining, by the terminal device, that the priority of the first scheduling request is lower than the priority of the second scheduling request.

4. The method according to claim 1, wherein if the first priority information of the scheduling requests is the symbol duration information of the scheduling requests, the determining, by the terminal device, the priority of the first scheduling request and the priority of the second scheduling request according to the first priority information of the first scheduling request and the first priority information of the second scheduling request further comprises:

if a spacing between subcarriers used to carry the first scheduling request is greater than a spacing between subcarriers used to carry the second scheduling request, determining, by the terminal device, that the priority of the first scheduling request is higher than the priority of the second scheduling request; or if the spacing between sub carriers used to carry the first scheduling request is less than the spacing between subcarriers used to carry the second scheduling request, determining, by the terminal device, that the priority of the second scheduling request is higher than the priority of the first scheduling request.

5. The method according to claim 1, wherein if the first priority information of the scheduling requests is the transmission durations of the scheduling requests, the determining, by the terminal device, the priority of the first scheduling request and the priority of the second scheduling request according to the first priority information of the first scheduling request and the first priority information of the second scheduling request further comprises:

if a transmission duration of the first scheduling request is shorter than a transmission duration of the second scheduling request, determining, by the terminal device, that the priority of the first scheduling request is higher than the priority of the second scheduling request; or if the transmission duration of the first scheduling request is longer than the transmission duration of the second scheduling request, determining, by the terminal device, that the priority of the first scheduling request is lower than the priority of the second scheduling request.

6. The method according to claim 1, wherein if the first priority information of the scheduling requests is the quantities of unsuccessful transmissions of the scheduling requests, the determining, by the terminal device, the priority of the first scheduling request and the priority of the second scheduling request according to the first priority information of the first scheduling request and the first priority information of the second scheduling request further comprises:

if a quantity of unsuccessful transmissions of the first scheduling request is greater than a quantity of unsuccessful transmissions of the second scheduling request, determining, by the terminal device, that the priority of the first scheduling request is higher than the priority of the second scheduling request; or if the quantity of unsuccessful transmissions of the first scheduling request is less than the quantity of unsuccessful transmissions of the second scheduling request, determining, by the terminal device, that the priority of the first scheduling request is lower than the priority of the second scheduling request.

7. The method according to claim 1, further comprising: determining, by the terminal device, second priority information of the first scheduling request and second priority information of the second scheduling request, wherein the second priority information of the scheduling requests comprises periods of the scheduling requests; and the determining, by the terminal device, the priority of the first scheduling request and the priority of the second scheduling request according to first priority information of the first scheduling request and first priority information of the second scheduling request further comprises:

determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request.

8. The method according to claim 7, wherein if the first priority information of the scheduling requests is the symbol duration information of the scheduling requests, the transmission durations of the scheduling requests, and the quantities of unsuccessful transmissions of the scheduling requests, the determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request further comprises:
- if a quantity of unsuccessful transmissions of the first scheduling request is equal to a preset threshold and a quantity of unsuccessful transmissions of the second scheduling request is less than the preset threshold, determining, by the terminal device, that the priority of the first scheduling request is higher than the priority of the second scheduling request;
- if the quantity of unsuccessful transmissions of the first scheduling request is less than the preset threshold and the quantity of unsuccessful transmissions of the second scheduling request is equal to the preset threshold, determining, by the terminal device, that the priority of the first scheduling request is lower than the priority of the second scheduling request; or
- if the quantity of unsuccessful transmissions of the first scheduling request and the quantity of unsuccessful transmissions of the second scheduling request are both equal to the preset threshold or are both unequal to the preset threshold, determining, by the terminal device, the priority of the first scheduling request and the priority of the second scheduling request according to the first priority information of the first scheduling request, the second priority information of the first scheduling request, the first priority information of the second scheduling request, and the second priority information of the second scheduling request.

9. The method according to claim 1, wherein if the first priority information of the scheduling requests is whether the scheduling requests use the OCCs, the determining, by the terminal device, the priority of the first scheduling request and the priority of the second scheduling request according to the first priority information of the first scheduling request and the first priority information of the second scheduling request further comprises:
- if at least one of the first scheduling request and the second scheduling request uses the OCC, determining, by the terminal device, a type of a first uplink control channel and a type of a second uplink control channel, wherein the first uplink control channel is used to carry the first scheduling request, and the second uplink control channel is used to carry the second scheduling request; and
- if the type of the first uplink control channel is a long physical uplink control channel, and the type of the second uplink control channel is a one-symbol short physical uplink control channel or a two-symbol short physical uplink control channel, and a time domain location of a first symbol on the first uplink control channel or a time domain location of a first symbol in a frequency hopping part of the first uplink control channel is the same as a time domain location of a first symbol on the second uplink control channel, determining, by the terminal device, that the priority of the second scheduling request is higher than the priority of the first scheduling request;
- if the type of the first uplink control channel is the long physical uplink control channel, and the type of the second uplink control channel is the one-symbol short physical uplink control channel, and a time domain location of any symbol other than the first symbol on the first uplink control channel and the first symbol in a frequency hopping part thereof is the same as the time domain location of a first symbol on the second uplink control channel, determining, by the terminal device, that the priority of the first scheduling request is higher than the priority of the second scheduling request; or
- if the first uplink control channel is the long physical uplink control channel, and the type of the second uplink control channel is the two-symbol short physical uplink control channel, and the time domain location of the first symbol on the first uplink control channel or the time domain location of the first symbol in a frequency hopping part of the first uplink control channel is the same as a time domain location of a second symbol on the second uplink control channel, and the first scheduling request uses the OCC, determining, by the terminal device, that the priority of the first scheduling request is lower than the priority of the second scheduling request.

10. The method according to claim 1, further comprising:
- if a type of a first uplink control channel is a long physical uplink control channel, and a type of a second uplink control channel is a short physical uplink control channel, and the priority of the first scheduling request is higher than the priority of the second scheduling request, sending, by the terminal device, the second scheduling request to the base station, wherein the first uplink control channel is used to carry the first scheduling request, the second uplink control channel is used to carry the second scheduling request, and the time domain resource used by the terminal device to send the first scheduling request is different from the time domain resource used to send the second scheduling request; or
- if the type of the first uplink control channel is the long physical uplink control channel, and the type of the second uplink control channel is the short physical uplink control channel, and the priority of the first scheduling request is lower than the priority of the second scheduling request, and if that the symbol used to transmit the first scheduling request can carry a demodulation reference signal and uplink control information, sending, by the terminal device, the first scheduling request to the base station, wherein the time domain resource used by the terminal device to send the first scheduling request is different from the time domain resource used to send the second scheduling request.

11. The method according to claim 9, further comprising:
- if the type of the first uplink control channel is the long physical uplink control channel, and the type of the second uplink control channel is the one-symbol short physical uplink control channel, and the priority of the second scheduling request is higher than the priority of the first scheduling request, and the symbol used to transmit the first scheduling request can carry a demodulation reference signal and uplink control information, sending, by the terminal device, a part of the first scheduling request carried by a first frequency resource, wherein the first frequency domain resource is different from a second frequency domain resource, the second frequency domain resource is a frequency domain resource used to transmit the second scheduling request, and the time domain resource used by the terminal device to send the first scheduling request is different from the time domain resource used to send the second scheduling request; or
- if the type of the first uplink control channel is the long physical uplink control channel, and the type of the second uplink control channel is the one-symbol short physical uplink control channel, and the priority of the second scheduling request is lower than the priority of the first scheduling request, sending, by the terminal device, the second scheduling request to the base station, wherein the time domain resource used by the terminal device to send the first scheduling request is different from the time domain resource used to send the second scheduling request.

12. A method for determining priorities of scheduling requests, comprising:
   determining, by a terminal device before a start time of a first time domain resource, that a start time of a second time domain resource is equal to or later than the start time of the first time domain resource and the start time of the second time domain resource is earlier than an end time of the first time domain resource, wherein the first time domain resource is used to transmit a first scheduling request, and the second time domain resource is used to transmit a second scheduling request;
   determining, by the terminal device, a priority of the first scheduling request and a priority of the second scheduling request according to priority information of the first scheduling request and priority information of the second scheduling request, wherein the priority information of the scheduling requests is at least one of: service types of the scheduling requests and periods of the scheduling requests;
   if the priority of the first scheduling request is higher than the priority of the second scheduling request, sending, by the terminal device, the first scheduling request to a base station; or
   if the priority of the first scheduling request is lower than the priority of the second scheduling request, sending, by the terminal device, the second scheduling request to the base station;
   wherein if the priority information of the scheduling requests is the periods of the scheduling requests, the determining, by the terminal device, the priority of the first scheduling request and the priority of the second scheduling request according to the priority information of the first scheduling request and the priority information of the second scheduling request further comprises:
   if a period of the first scheduling request is shorter than a period of the second scheduling request, determining, by the terminal device, that the priority of the first scheduling request is higher than the priority of the second scheduling request or
   if the period of the second scheduling request is shorter than the period of the first scheduling request, determining, by the terminal device, that the priority of the second scheduling request is higher than the priority of the first scheduling request.

13. The method according to claim 12, wherein if the priority information of the scheduling requests is the service types of the scheduling requests, the determining, by the terminal device, the priority of the first scheduling request and the priority of the second scheduling request according to the priority information of the first scheduling request and the priority information of the second scheduling request further comprises:
   if a service type of the first scheduling request is ultra-reliable low-latency communication and a service type of the second scheduling request is enhanced mobile broadband, determining, by the terminal device, that the priority of the first scheduling request is higher than the priority of the second scheduling request; or
   if the service type of the second scheduling request is ultra-reliable low-latency communication and the service type of the first scheduling request is enhanced mobile broadband, determining, by the terminal device, that the priority of the second scheduling request is higher than the priority of the first scheduling request.

14. The method according to claim 12, wherein if the priority information of the scheduling requests is the service types of the scheduling requests and the periods of the scheduling requests, the determining, by the terminal device, the priority of the first scheduling request and the priority of the second scheduling request according to priority information of the first scheduling request and priority information of the second scheduling request further comprises:
   if the service type of the first scheduling request is ultra-reliable low-latency communication and the service type of the second scheduling request is enhanced mobile broadband, determining, by the terminal device, that the priority of the first scheduling request is higher than the priority of the second scheduling request;
   if the service type of the second scheduling request is ultra-reliable low-latency communication and the service type of the first scheduling request is enhanced mobile broadband, determining, by the terminal device, that the priority of the second scheduling request is higher than the priority of the first scheduling request;
   if the service type of the first scheduling request is the same as a service type of the second scheduling request and a period of the first scheduling request is shorter than a period of the second scheduling request, determining, by the terminal device, that the priority of the first scheduling request is higher than the priority of the second scheduling request; or
   if the service type of the first scheduling request is the same as a service type of the second scheduling request and the period of the first scheduling request is longer than the period of the second scheduling request, determining, by the terminal device, that the priority of the first scheduling request is lower than the priority of the second scheduling request.

* * * * *